United States Patent
Kuno et al.

(10) Patent No.: US 10,515,021 B2
(45) Date of Patent: Dec. 24, 2019

(54) INFORMATION PROCESSING TO SET USAGE PERMISSION IN CONTENT

(71) Applicant: SONY CORPORATION, Minato-ku (JP)

(72) Inventors: Hiroshi Kuno, Kanagawa (JP); Takamichi Hayashi, Tokyo (JP); Yoshiyuki Kobayashi, Tokyo (JP); Katsumi Muramatsu, Tokyo (JP); Koji Yoshimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/370,852

(22) PCT Filed: Dec. 26, 2012

(86) PCT No.: PCT/JP2012/083614
§ 371 (c)(1),
(2) Date: Jul. 7, 2014

(87) PCT Pub. No.: WO2013/132728
PCT Pub. Date: Sep. 12, 2013

(65) Prior Publication Data
US 2015/0143131 A1    May 21, 2015

(30) Foreign Application Priority Data
Mar. 9, 2012    (JP) .................................. 2012-052549

(51) Int. Cl.
*G06F 12/14* (2006.01)
*G06F 21/60* (2013.01)
*G06F 21/62* (2013.01)
(Continued)

(52) U.S. Cl.
CPC .......... *G06F 12/1408* (2013.01); *G06F 21/10* (2013.01); *G06F 21/602* (2013.01);
(Continued)

(58) Field of Classification Search
CPC .................................. G06F 21/10; G06F 21/78
See application file for complete search history.

(56) References Cited

U.S. PATENT DOCUMENTS

2002/0002468 A1* 1/2002 Spagna ................... G06F 21/10
    713/193
2002/0073102 A1* 6/2002 Okamoto ................ G06F 21/10
(Continued)

FOREIGN PATENT DOCUMENTS

| JP | 2000-357127 | 12/2000 |
| JP | 2003-309545 | 10/2003 |

(Continued)

OTHER PUBLICATIONS

International Search Report dated Mar. 19, 2013 in International Application No. PCT/JP2012/083614.

*Primary Examiner* — Samson B Lemma
(74) *Attorney, Agent, or Firm* — Chip Law Group

(57) ABSTRACT

According to a first aspect of the present disclosure, there is provided an information storage device including a storage unit that stores encrypted content, usage control information of the encrypted content, and a revocation list in which revocation information of a content reproduction device is recorded, and a data processing unit that determines whether content reproduction of an information processing device which performs decoding of the encrypted content is permitted. The data processing unit acquires an entry identifier which is designation information for a registration entry of the revocation list recorded in the usage control information, executes an identifier registration determination process for determining whether an identifier of the information processing device which performs decoding of the encrypted content is registered in the entry of the revocation list identified according to the acquired entry identifier, and determines whether a subkey which is a generation key for (Continued)

a title key applied to the decoding of the encrypted content is to be provided to the information processing device based on a result of the identifier registration determination process.

16 Claims, 16 Drawing Sheets

(51) Int. Cl.
*H04L 9/08* (2006.01)
*H04L 9/32* (2006.01)
*G06F 21/10* (2013.01)

(52) U.S. Cl.
CPC ............ *G06F 21/62* (2013.01); *H04L 9/0866* (2013.01); *H04L 9/0891* (2013.01); *H04L 9/0894* (2013.01); *H04L 9/3273* (2013.01); *G06F 2212/1052* (2013.01); *H04L 2209/60* (2013.01)

(56) References Cited

U.S. PATENT DOCUMENTS

| | | | | |
|---|---|---|---|---|
| 2003/0101346 A1* | 5/2003 | Barron | ................. | H04L 9/0827 713/175 |
| 2004/0010701 A1* | 1/2004 | Umebayashi | ....... | G06F 21/6227 713/193 |
| 2004/0093505 A1* | 5/2004 | Hatakeyama | ........... | G06F 21/71 713/189 |
| 2005/0021941 A1* | 1/2005 | Ohmori | ............ | G11B 20/00086 713/156 |
| 2005/0044046 A1 | 2/2005 | Ishiguro | | |
| 2007/0098178 A1* | 5/2007 | Raikar | .................. | H04L 63/062 380/282 |
| 2008/0040282 A1* | 2/2008 | Yamamoto | ............. | H04N 7/163 705/52 |
| 2008/0133414 A1* | 6/2008 | Qin | ........................ | G06F 21/10 705/50 |
| 2008/0304364 A1* | 12/2008 | Holtzman | ............... | G06F 21/10 368/10 |
| 2012/0311675 A1* | 12/2012 | Ham | ........................ | G06F 8/61 726/4 |

FOREIGN PATENT DOCUMENTS

| | | |
|---|---|---|
| JP | 2008-98765 A | 4/2008 |
| JP | 2008-98765 A5 | 4/2008 |
| JP | 2012-44577 A | 3/2012 |
| JP | 2012-44577 A5 | 3/2012 |

\* cited by examiner

FIG. 11

132 USAGE CONTROL INFORMATION

| |
|---|
| HEADER INFORMATION (Header) |
| SUBKEY FLAG (SubKey Flag) |
| REVOCATION/USAGE PERMISSION IDENTIFICATION FLAG (B/W IDENTIFICATION FLAG) |
| REVOCATION LIST ENTRY IDENTIFIER (RLED/PHEID) |
| CONTENT ISSUANCE DATE AND TIME (Issue Date) |
| COPY CONTROL INFORMATION (CCI) |
| USAGE PERIOD CONTROL INFORMATION (Period) |
| USAGE PERIOD CONTROL INFORMATION (Before) |
| USAGE PERIOD CONTROL INFORMATION (After) |
| MOVEMENT CONTROL INFORMATION (Move OK/NG) |
| ⋅⋅ |

- FLAG INDICATING WHETHER SUBKEY IS USED FOR TITLE KEY CALCULATION
  FOR EXAMPLE,
  0: SUBKEY IS NOT USED
  1: SUBKEY IS USED

- FLAG INDICATING WHICH OF REVOCATION HOST ENTRY (B) AND USAGE PERMISSION HOST ENTRY (W) IS REFERRED TO
  FOR EXAMPLE,
  0: REVOCATION INFORMATION ENTRY (B)
  1: USAGE PERMISSION INFORMATION ENTRY (W)

- IDENTIFIER INDICATING ENTRY OF REVOCATION LIST TO BE REFERRED TO IN CONTENT USE
  (RLEID/PHEID IS NECESSARY FOR SUBKEY CALCULATION)

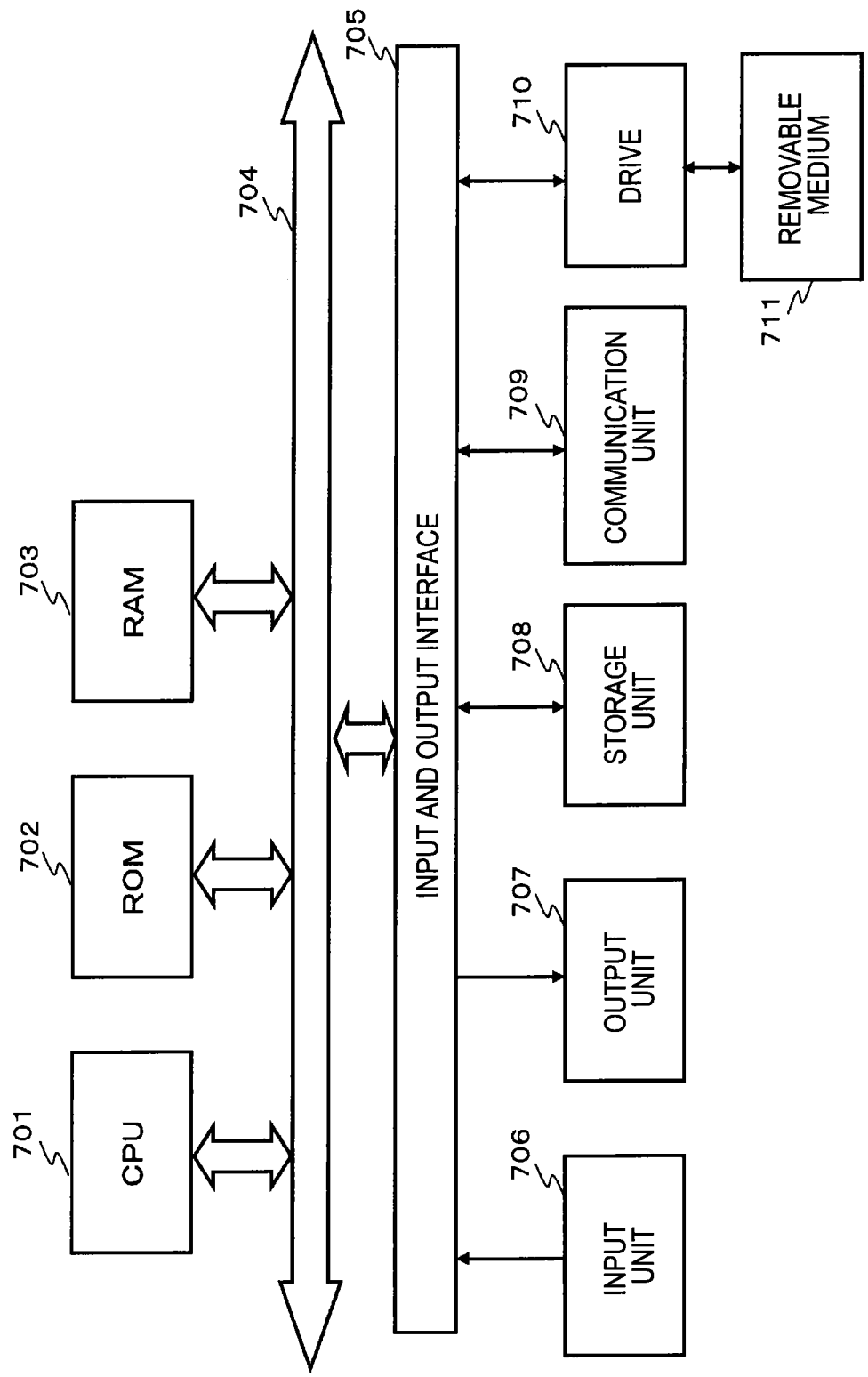

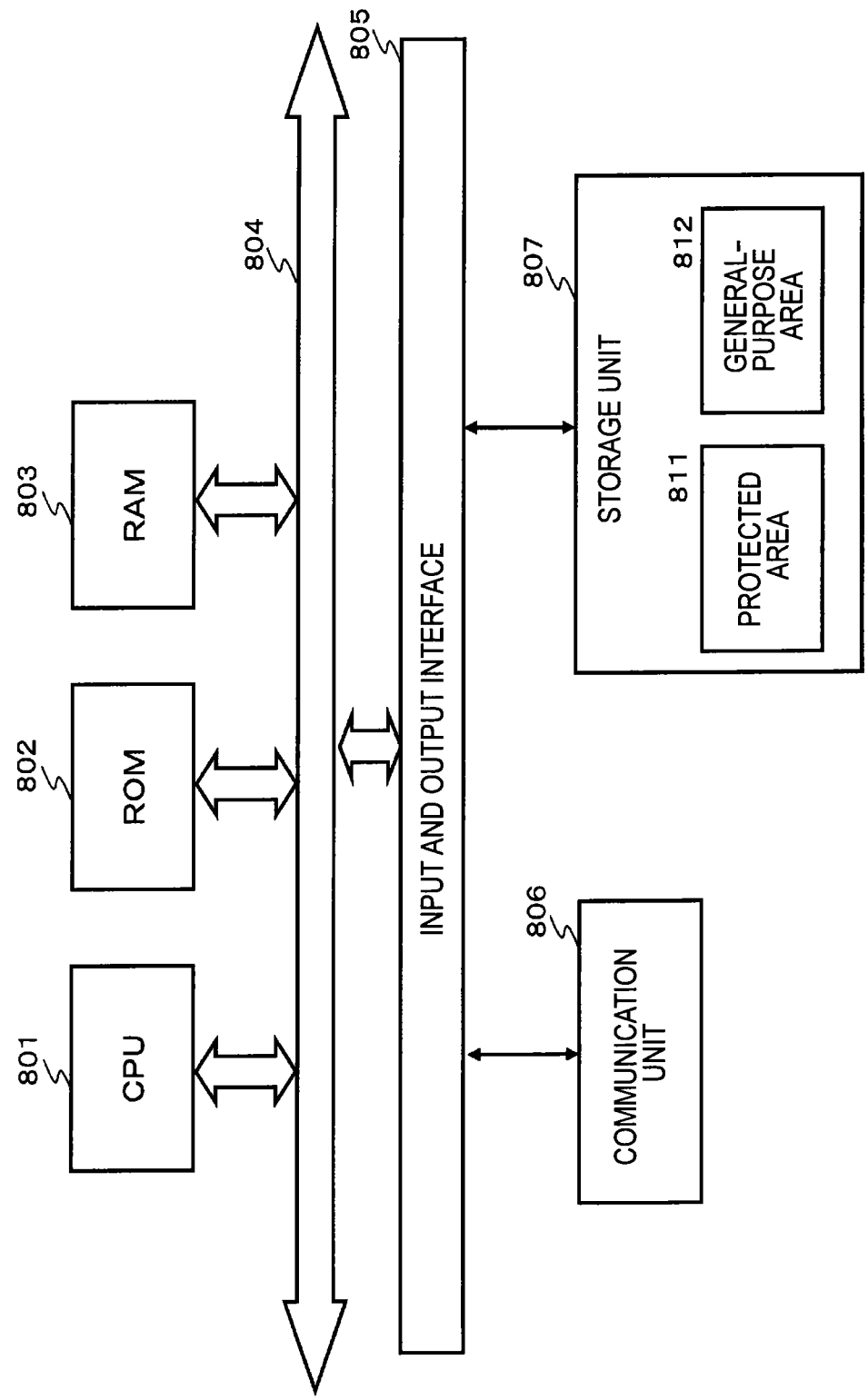

INFORMATION PROCESSING TO SET USAGE PERMISSION IN CONTENT

TECHNICAL FIELD

The present disclosure relates to an information processing device, an information storage device, an information processing system, an information processing method, and a program. Particularly, the disclosure relates to an information processing device, an information storage device, an information processing system, an information processing method, and a program which perform content usage control.

BACKGROUND ART

Content such as movies or music is provided to users via various kinds of media including a DVD (Digital Versatile Disc), a Blu-ray Disc (registered trademark) and a flash memory, a network such as the Internet, broadcasting waves, and the like. Users can reproduce the content using, for example, various information processing devices, including a recording and reproduction device such as a PC, a mobile terminal or a BD player, a television, and the like.

However, producers or distributors of many kinds of content such as music data, image data, and the like provided to users hold copyrights, distribution rights, and the like. Thus, when content is provided to the users, content providers impose predetermined content usage restrictions.

There is a problem spreading in digital recording devices and recording media in that recording and reproduction can be repeated without deteriorating images and sounds, and uses of fraudulently copied content including distribution of such fraudulently copied content through the Internet or distribution of so-called pirated discs are prevalent.

A concrete configuration for preventing such fraudulent use of content includes a process of encrypting the content. In this configuration, content to be provided to users is encrypted and an encryption key is set to be acquired only by regular users. This process is described, for example, in Patent Literature 1 (Japanese Patent Laid-Open Publication No. 2008-98765) or the like.

A key used to decode the encrypted data is given only to a reproduction device with a license which is a content use right. The license is given to, for example, a reproduction device designed to conform to predetermined action regulations, such as not to perform fraudulent copying. On the other hand, since a reproduction device with no license has no key for decoding the encrypted data, it is difficult to perform decoding of the encrypted data.

However, even when such content encryption is executed, fraudulent use of the content is performed.

An example of the fraudulent use of the content will be described.

The content is recorded, for example, in a medium (memory card) such as a flash memory.

A media key set (MKS) which is an encryption key set specific to the memory card has been stored in the memory card in advance.

This encryption key set (MKS), for example, includes a key set including a public key and a private key issued by a license management device (LA: License Authority). Further, in many cases, the public key is stored in a public key certificate (PKC) and provided.

The public key certificate (PKC) is a certificate which includes an identifier (ID) of a device (a host or a media) as recorded data, in addition to the public key. A signature of the license management device (LA) is set in the public key certificate.

For example, when the content stored in the memory card is reproduced or when new content is recorded in the memory card, a cross-authentication process is executed between a device (host) having the memory card mounted thereon and the memory card. For example, the cross-authentication process of a public key cryptosystem is performed, and the encryption key set (MKS) described above is applied.

In the authentication process, the host and the medium mutually confirm that the partner device is not a fraudulent device. If this authentication is successful, the host is permitted to read the content or the encryption key applied to decoding of the content, which has been recorded in the memory card.

Further, the license management device (LA) issues a revocation list which is a list of identifiers (IDs) of fraudulent devices and provides the revocation list to the device executing the cross-authentication described above. The device executing the cross-authentication executes a confirmation as to whether an ID of the authentication partner device is registered in the revocation list with reference to the revocation list.

When the ID of the authentication partner is recorded in the revocation list, the authentication partner is confirmed to be fraudulent, the authentication fails, and subsequent processes such as content reproduction and recording are prohibited.

The revocation list is issued and sequentially updated by the license management device (LA). In addition, an electronic signature of the license management device (LA) which is an issuing entity is given and a structure in which falsification is prevented is adopted.

For example, a user device performing content reproduction or the like confirms validity of the revocation list through signature verification of the revocation list, and then confirms registered IDs of the revocation list. In other words, the user device confirms whether the ID of the reproduction device or the storage device is registered, and performs a subsequent process, that is, a process such as content reproduction only when the ID is confirmed not to be registered.

When a new fraudulent device is found, the license management device (LA) executes a process of updating the revocation list to additionally register an ID of the new fraudulent device. In other words, a revocation list which has a higher version (which is updated) is sequentially distributed.

The updated revocation list is provided to the user device over a network. Alternatively, the revocation list is recorded in a medium having the content recorded therein and provided to the user device.

For example, when a host device executing reproduction of the content stored in the medium, such as a memory card, is recognized as a fraudulent device, the license management device generates a revocation list of the latest version obtained by recording, in the revocation list, an identifier (ID) of the fraudulent host device or an identifier (ID) of a host public key certificate (Host Certificate) in which a public key of a host provided to the host device is stored, and distributes the revocation list to the user device (a reproduction device, a recording device, a PC, a recording medium, etc.) over a network or a content recording medium.

When the revocation list acquired through the network or the revocation list acquired through connection with another device has a newer version than the revocation list stored in a storage unit of the own device, the user device performs a process of replacing the revocation list of a lower version stored in the storage unit of the own device with the revocation list of the new version.

Thus, the revocation list stored in each user device is sequentially replaced with the revocation list of the new version. Therefore, when a new fraudulent device is found, it is possible to steadily prohibit use of the fraudulent device.

However, for example, when the host device is revoked and its host device ID is registered in the revocation list, it is difficult for the host device to use all content.

In other words, this usage control using the revocation list realizes the usage control in units of hosts, but suffers from a problem that it is difficult to execute usage control in units of pieces of content. For example, there is a problem in that it is difficult to perform usage control in units of individual pieces of content so that use of content X by one host A is permitted and use of content Y is not permitted.

A specific example of the usage control in units of pieces of content includes, for example, the following usage control.

Reproduction of certain content X by only a set of specific hosts (a host group A) is permitted and reproduction by a set of other hosts (a host group B or C) is not permitted.

Further, reproduction of content Y by the host groups A and B is permitted and reproduction by the other host group (the host group C) is not permitted.

It is difficult for a process of changing a usage permission host or a usage prohibition host in units of individual pieces of content as described above to be realized using the revocation list in related art.

Thus, the usage control using the revocation list in the related art realizes the control in units of hosts to limit the use of all content in units of hosts, but suffers from a problem in that it is difficult to freely set the usage permission host or the usage prohibition host in units of individual pieces of content.

CITATION LIST

Patent Literature

[Patent Literature 1] Japanese Patent Laid-Open Publication No. 2008-98765

SUMMARY OF INVENTION

Technical Problem

The present disclosure, for example, has been made in view of the aforementioned problems, and an object of the disclosure is to provide an information processing device, an information storage device, an information processing system, an information processing method, and a program which can freely set a usage permission host or a usage prohibition host in units of individual pieces of content in a configuration for prohibition of fraudulent use of content using a revocation list.

Solution to Problem

According to a first aspect of the present disclosure, there is provided an information storage device including a storage unit that stores encrypted content, usage control information of the encrypted content, and a revocation list in which revocation information of a content reproduction device is recorded, and a data processing unit that determines whether content reproduction of an information processing device which performs decoding of the encrypted content is permitted. The data processing unit acquires an entry identifier which is designation information for a registration entry of the revocation list recorded in the usage control information, executes an identifier registration determination process for determining whether an identifier of the information processing device which performs decoding of the encrypted content is registered in the entry of the revocation list identified according to the acquired entry identifier, and determines whether a subkey which is a generation key for a title key applied to the decoding of the encrypted content is to be provided to the information processing device based on a result of the identifier registration determination process.

According to an embodiment of the present disclosure, the data processing unit may generate the subkey based on the result of the identifier registration determination process.

According to an embodiment of the present disclosure, the data processing unit may apply the entry identifier to generate the subkey.

According to an embodiment of the present disclosure, the revocation list may have a structure in which a content-corresponding revocation host entry in which a host ID of a usage prohibition host set in units of pieces of content is registered is recorded. The entry identifier which is designation information for a registration entry of the revocation list recorded in the usage control information may be an entry identifier which identifies the content-corresponding revocation host entry. The data processing unit may execute an identifier registration determination process for determining whether an identifier of the information processing device performing decoding of the encrypted content is registered in an entry identified according to the entry identifier which identifies the content-corresponding revocation host entry recorded in the usage control information, and generate the subkey which is a generation key for the title key applied to decoding of the encrypted content for the information processing device only when the identifier of the information processing device is not registered in the identifier registration determination process.

According to an embodiment of the present disclosure, the revocation list may have a structure in which a content-corresponding usage permission host entry in which a host ID of a usage permission host set in units of pieces of content is registered is recorded. The entry identifier which is designation information for a registration entry of the revocation list recorded in the usage control information may be an entry identifier which identifies the content-corresponding usage permission host entry. The data processing unit may executes an identifier registration determination process for determining whether an identifier of the information processing device performing decoding of the encrypted content is registered in an entry identified according to the entry identifier which identifies the content-corresponding usage permission host entry recorded in the usage control information, and may generate a subkey which is a generation key for the title key applied to decoding of the encrypted content for the information processing device only when the identifier of the information processing device is registered in the identifier registration determination process.

According to an embodiment of the present disclosure, the storage unit may store a converted title key obtained by converting the title key applied to the decoding of the encrypted content. When the subkey is determined to be provided to the information processing device as a result of the identifier registration determination process, the data processing unit may generate the subkey applied to calculate the title key from the converted title key, and provides the subkey to the information processing device.

According to an embodiment of the present disclosure, the converted title key may be data generated through an operation process including an exclusive OR operation of a title key and the subkey.

According to an embodiment of the present disclosure, the data processing unit may execute an encryption process or an operation process using a private key of the information storage device for constituent data of the entry identifier to generate the subkey.

According to a second aspect of the present disclosure, there is provided an information processing device including a data processing unit which reads encrypted content recorded in an information storage device and executes a decoding process, The data processing unit acquires a converted title key which is conversion data of a title key applied to decoding of the encrypted content, and usage control information of the encrypted content from the information storage device, acquires an entry identifier which is designation information for a registration entry of a revocation list in which revocation information of a content reproduction device is recorded from the usage control information, and outputs the entry identifier to the information storage device, receives a subkey that the information storage device generates through an encryption process or an operation process for constituent data of the entry identifier, and calculates the title key through an operation process of the converted title key and the subkey.

According to a third aspect of the present disclosure, there is provided an information processing device including a data processing unit which generates encrypted content to be recorded in an information storage device and a title key applied to decoding of the encrypted content. The data processing unit outputs, to the information storage device, an entry identifier capable of identifying an entry of a revocation list in which an ID of a host by which the use of the encrypted content recorded in the information storage device is permitted or prohibited is recorded, receives a subkey that the information storage device generates through an encryption process or an operation process for constituent data of the entry identifier, and generates a converted title key through an operation process of the title key and the subkey, and outputs the generated converted title key as recorded data for the information storage device.

According to a fourth aspect of the present disclosure, there is provided an information processing system including a server that records encrypted content and usage control information corresponding to the encrypted content in an information storage device, and the information storage device that stores the encrypted content and the usage control information. The server outputs, to the information storage device, the usage control information in which an entry identifier capable of identifying an entry of a revocation list in which an ID of a host by which the use of the encrypted content is permitted or prohibited is recorded is stored. The information storage device generates a subkey through an encryption process or an operation process for constituent data of the entry identifier and outputs the subkey to the server. The server generates a converted title key through an operation process of a title key which is a decoding key for the encrypted content and the subkey, and outputs the converted title key to the information storage device. The information storage device stores the converted title key in a storage unit.

According to a fifth aspect of the present disclosure, there is provided an information processing system including an information storage device that stores encrypted content, a converted title key which is conversion data of a title key which is a decoding key for the encrypted content, and usage control information corresponding to the encrypted content, and a host device which reads and decodes the encrypted content. The host device reads an entry identifier recorded in the usage control information input from the information storage device, the entry identifier being an entry identifier capable of identifying an entry of a revocation list in which an ID of a host by which the use of the encrypted content is permitted or prohibited is recorded, and outputs the entry identifier to the information storage device. The information storage device generates a subkey through an encryption process or an operation process for constituent data of the entry identifier and outputs the subkey to the host device. The host device calculates the title key through an operation process of the converted title key and the subkey.

According to a sixth aspect of the present disclosure, there is provided an information processing method executed in an information storage device. The information storage device includes a storage unit that stores encrypted content, usage control information of the encrypted content, and a revocation list in which revocation information of a content reproduction device is recorded, and a data processing unit that determines whether content reproduction of an information processing device which performs decoding of the encrypted content is permitted. The data processing unit acquires an entry identifier which is designation information for a registration entry of the revocation list recorded in the usage control information, executes an identifier registration determination process for determining whether an identifier of the information processing device which performs decoding of the encrypted content is registered in the entry of the revocation list identified according to the acquired entry identifier, and determines whether a subkey which is a generation key for a title key applied to the decoding of the encrypted content is to be provided to the information processing device based on a result of the identifier registration determination process.

According to a seventh aspect of the present disclosure, there is provided an information processing method executed in an information processing device including a data processing unit which reads encrypted content recorded in an information storage device and executes a decoding process. The data processing unit acquires a converted title key which is conversion data of a title key applied to decoding of the encrypted content, and usage control information of the encrypted content from the information storage device, acquires an entry identifier which is designation information for a registration entry of a revocation list in which revocation information of a content reproduction device is recorded from the usage control information, and outputs the entry identifier to the information storage device, receives a subkey that the information storage device generates through an encryption process or an operation process for constituent data of the entry identifier, and calculates the title key through an operation process of the converted title key and the subkey.

According to an eighth aspect of the present disclosure, there is provided an information processing method executed in a server including a data processing unit which generates encrypted content to be recorded in an information storage device and a title key applied to decoding of the encrypted content. The data processing unit outputs, to the information storage device, an entry identifier capable of identifying an entry of a revocation list in which an ID of a host by which the use of the encrypted content recorded in the information storage device is permitted or prohibited is recorded, receives a subkey that the information storage device generates through an encryption process or an operation process for constituent data of the entry identifier, and generates a converted title key through an operation process of the title key and the subkey, and outputs the generated converted title key as recorded data for the information storage device.

According to a ninth aspect of the present disclosure, there is provided a program which causes information processing to be executed in an information storage device. The information storage device includes a storage unit that stores encrypted content, usage control information of the encrypted content, and a revocation list in which revocation information of a content reproduction device is recorded, and a data processing unit that determines whether content reproduction of an information processing device which performs decoding of the encrypted content is permitted. The program causes the data processing unit to execute a process of acquiring an entry identifier which is designation information for a registration entry of the revocation list recorded in the usage control information, an identifier registration determination process for determining whether an identifier of the information processing device which performs decoding of the encrypted content is registered in the entry of the revocation list identified according to the acquired entry identifier, and a process of determining whether a subkey which is a generation key for a title key applied to the decoding of the encrypted content is to be provided to the information processing device based on a result of the identifier registration determination process.

According to a tenth aspect of the present disclosure, there is provided a program which causes an information processing device including a data processing unit which reads encrypted content recorded in an information storage device and executes a decoding process to execute information processing, the program causing the data processing unit to execute processes of acquiring a converted title key which is conversion data of a title key applied to decoding of the encrypted content, and usage control information of the encrypted content from the information storage device, acquiring an entry identifier which is designation information for a registration entry of a revocation list in which revocation information of a content reproduction device is recorded from the usage control information, and outputting the entry identifier to the information storage device, receiving a subkey that the information storage device generates through an encryption process or an operation process for constituent data of the entry identifier, and calculating the title key through an operation process of the converted title key and the subkey.

According to an eleventh aspect of the present disclosure, there is provided a program which causes information processing to be executed in a server including a data processing unit which generates encrypted content to be recorded in an information storage device and a title key applied to decoding of the encrypted content, the program causing the data processing unit to execute processes of outputting, to the information storage device, an entry identifier capable of identifying an entry of a revocation list in which an ID of a host by which the use of the encrypted content recorded in the information storage device is permitted or prohibited is recorded, receiving a subkey that the information storage device generates through an encryption process or an operation process for constituent data of the entry identifier, and generating a converted title key through an operation process of the title key and the subkey, and outputting the generated converted title key as recorded data for the information storage device.

The program of the present disclosure is a program that can be provided by a storage medium or a communication medium that is provided in a computer-readable form for an information processing device or a computer system capable of executing various types of program code, for example. Providing such a program in a computer-readable form realizes the process according to the program in the information processing device or the computer system.

The other objects, characteristics, and advantages of the present disclosure will be made clear from embodiments of the present disclosure which will be described below or a more detailed description based on the accompanying drawings. Furthermore, the system in the present disclosure has a configuration in which a plurality of devices are logically incorporated, and the respective devices may not be included within the same housing.

Advantageous Effects of Invention

According to the configuration of one embodiment of the present disclosure, the usage control in units of pieces of content is realized in the content usage control using the revocation list.

Specifically, the revocation list in which the encrypted content, the usage control information, and revocation information of the content reproduction device are recorded is stored in the information storage device such as a memory card, and the data processing unit determines whether the host is permitted to reproduce the content. The data processing unit acquires an entry identifier identifying a registration entry of the revocation list from the usage control information, determines whether the host ID is registered in the entry designated by the entry identifier, and determines whether the content reproduction by the host is permitted based on a determination result. The subkey which is a generation key for a title key used to decode the encrypted content is generated and provided only when the reproduction permission is determined.

With this configuration, the usage control in units of pieces of content is realized.

BRIEF DESCRIPTION OF DRAWINGS

FIG. 11 is a diagram illustrating an example of a data structure of usage control information.

FIG. 15 is a diagram illustrating an example of a hardware configuration of an information processing device.

FIG. 16 is a diagram illustrating an example of a hardware configuration of an information storage device such as a memory card.

DESCRIPTION OF EMBODIMENTS

Figure 1:
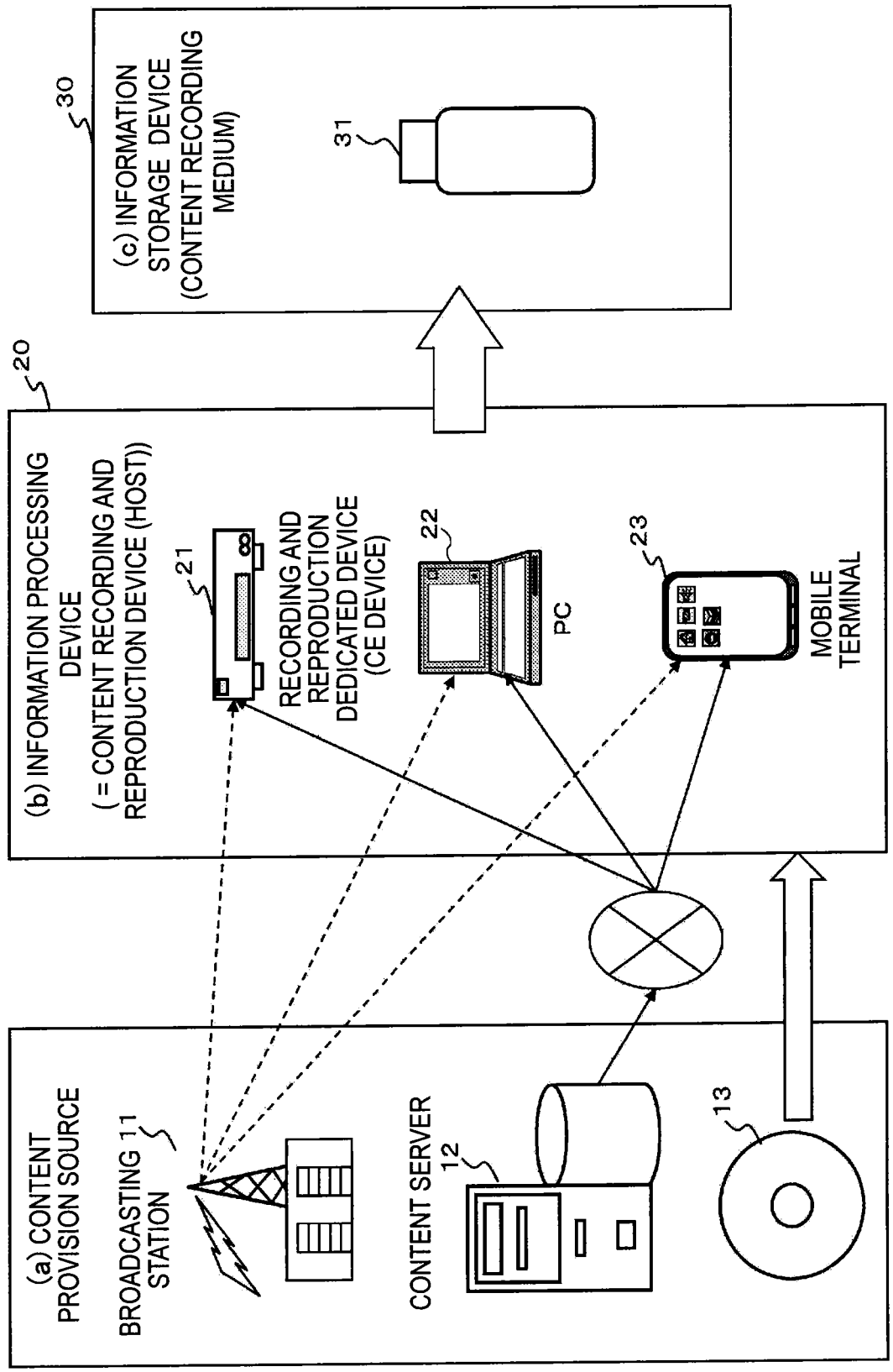
FIG. 1 is a diagram illustrating an overview of a content provision process and a content use process.

Hereinafter, an information processing device, an information storage device, an information processing system, an information processing method, and a program will be described in detail with reference to the drawings. Note that description will be provided according to the following subjects.

1. Regarding an overview of a content provision process and a content use process
2. Regarding an example of a configuration of an information storage device
3. Regarding an example of a data structure of a revocation list
4. Regarding an example of a data structure of usage control information
5. Regarding a content recording process sequence for an information storage device (medium)
6. Regarding a usage sequence of content stored in the information storage device (medium)
7. (Embodiment 2) Regarding an example of content usage control using a revocation list in which content usage permission host information is recorded
7-1 Regarding an example of a data structure of the revocation list in embodiment 2
7-2 Regarding an example of a data structure of usage control information in embodiment 2
7-3 Regarding a content recording process sequence for an information storage device (medium) in embodiment 2
7-4 Regarding a usage sequence for the content stored in the information storage device (medium) in embodiment 2
8. Regarding an example of a hardware configuration of each device
9. Summary of a configuration of the present disclosure

[1. Regarding an Overview of a Content Provision Process and a Content Use Process]

Hereinafter, a configuration of the present disclosure will be described with reference to the drawings First, an overview of the content provision process and the content use process will be described with reference to FIG. 1.

Examples of:
(a) a content provision source,
(b) an information processing device (content recording and reproduction device (host)), and
(c) an information storage device (content recording medium) are illustrated from the left in FIG. 1.

(c) The information storage device (content recording medium) 30 is a medium in which a user records content and uses the content for a content reproduction process. Here, for example, a memory card 31, which is an information storage device including a flash memory, is shown.

The user, for example, records various pieces of the content, such as music or movies, in the information storage device (content recording medium) 30 such as the memory card 31 and uses the content. For example, content which is a usage control target, such as content which is a copyright management target, is included in this content.

The content which is the usage control target includes, for example, content of which deregulated copying, copy data distribution or the like is prohibited, content whose usage period is limited, or the like. In addition, when the usage control content is recorded in the memory card 31, usage control information (Usage Rule) having copy restriction information, usage period restriction information, or the like corresponding to the content recorded therein is provided and recorded together.

Further, a license management device (LA) which performs content usage management generates a revocation list in which an identifier (ID) of a fraudulent device or an identifier (ID) of a public key certificate or the like of the fraudulent device is registered for an information processing device or an information storage device recognized as the fraudulent device, and provides the revocation list to each device. An electronic signature by a private key of the license management device (LA: License Authority) is set in the revocation list. A process of updating the revocation list is sequentially performed.

(a) A content provision source is a provision source for the content such as music or movies. For example, a broadcasting station 11, a content server 12, and a content recording medium 13 such as a BD or a DVD are illustrated as the content provision source in FIG. 1.

The broadcasting station 11 is, for example, a television station, and provides various broadcast content to [(b) information processing device (content recording and reproduction device (host))] which is a user device through terrestrial waves or satellite waves.

The content server 12 is a server which provides the content such as music or movies through a network such as the Internet.

The content recording medium 13 is a medium in which content such as movies has been recorded in advance, such as a BD-ROM or a DVD-ROM.

The user may mount, for example, the memory card 31 on the information processing device 20, and records, in the memory card 31, content received by the information processing device 20 from the outside or reproduced from the content recording medium 13.

Further, the information processing device 20, for example, may read and reproduce the content recorded in the memory card 31.

The information processing device 20 includes, for example, a recording and reproduction dedicated device (a CE device: Consumer Electronics device) 21, such as a DVD player, including a disk such as a hard disk, a DVD or a BD. Further, there is a PC 22, a mobile terminal 23 such as a smartphone, a mobile phone, a mobile player or a tablet terminal, or the like. All of these are devices on which the (c) information storage device 30 such as the memory card 31 can be mounted.

A form of using the memory card 31 will be described with reference to FIG. 2.

The memory card 31 which is one form of the information storage device 30 is, for example, a recording medium which can be attached or detached to or from a content reproduction device such as a PC, and can be freely removed from a device which has executed content recording and be attached to another user device.

Figure 2:
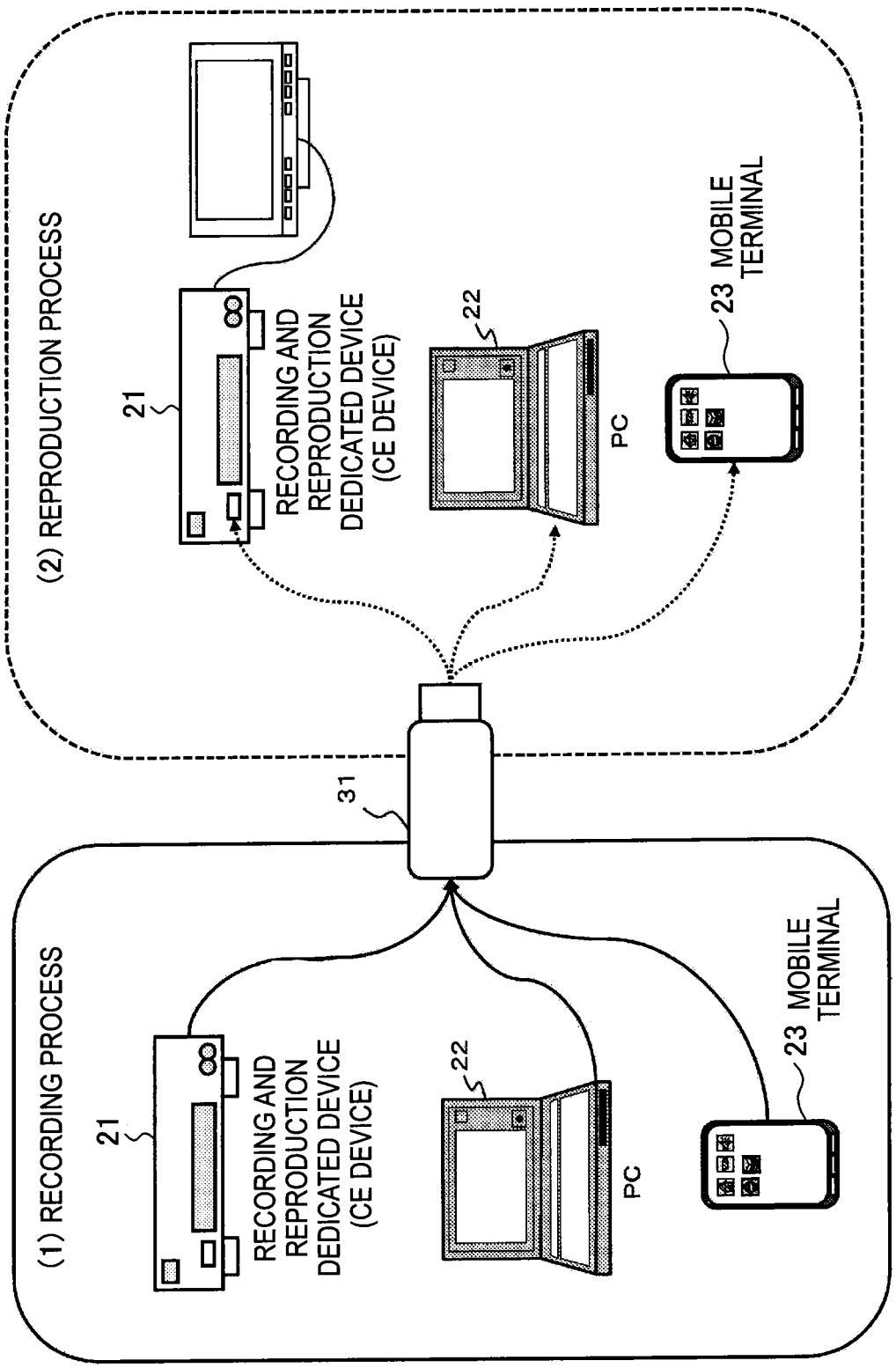
FIG. 2 is a diagram illustrating a form of using content recorded in a memory card.

In other words, (1) a recording process, and (2) a reproduction process are executed, as illustrated in FIG. 2.

In addition, there is a device which executes only one of recording and reproduction.

Further, devices which execute each of recording and reproduction are not necessarily the same, and the user may freely selectively use a recording device and a reproduction device.

Further, in many cases, the usage control content recorded in the memory card 31 is recorded as encrypted content, and the content reproduction device such as the recording and reproduction dedicated device 21, the PC 22, or the mobile terminal 23 executes a decoding process according to a predetermined sequence and then performs content reproduction.

In addition, a reproduction process or the like is performed in a usage permission aspect recorded in the usage control information (Usage Rule) which is set in correspondence with the content.

A program (host application) for executing a content usage or decoding process according to the usage control information (Usage Rule) is stored in the (b) content recording and reproduction device (host), and the content reproduction is executed according to this program (host application).

Further, both the information processing device 20 which executes content recording and reproduction and the information storage device 30 which stores the content store, in the storage unit, a revocation list that is a list in which identifiers (IDs) of fraudulent devices are recorded.

Figure 3:
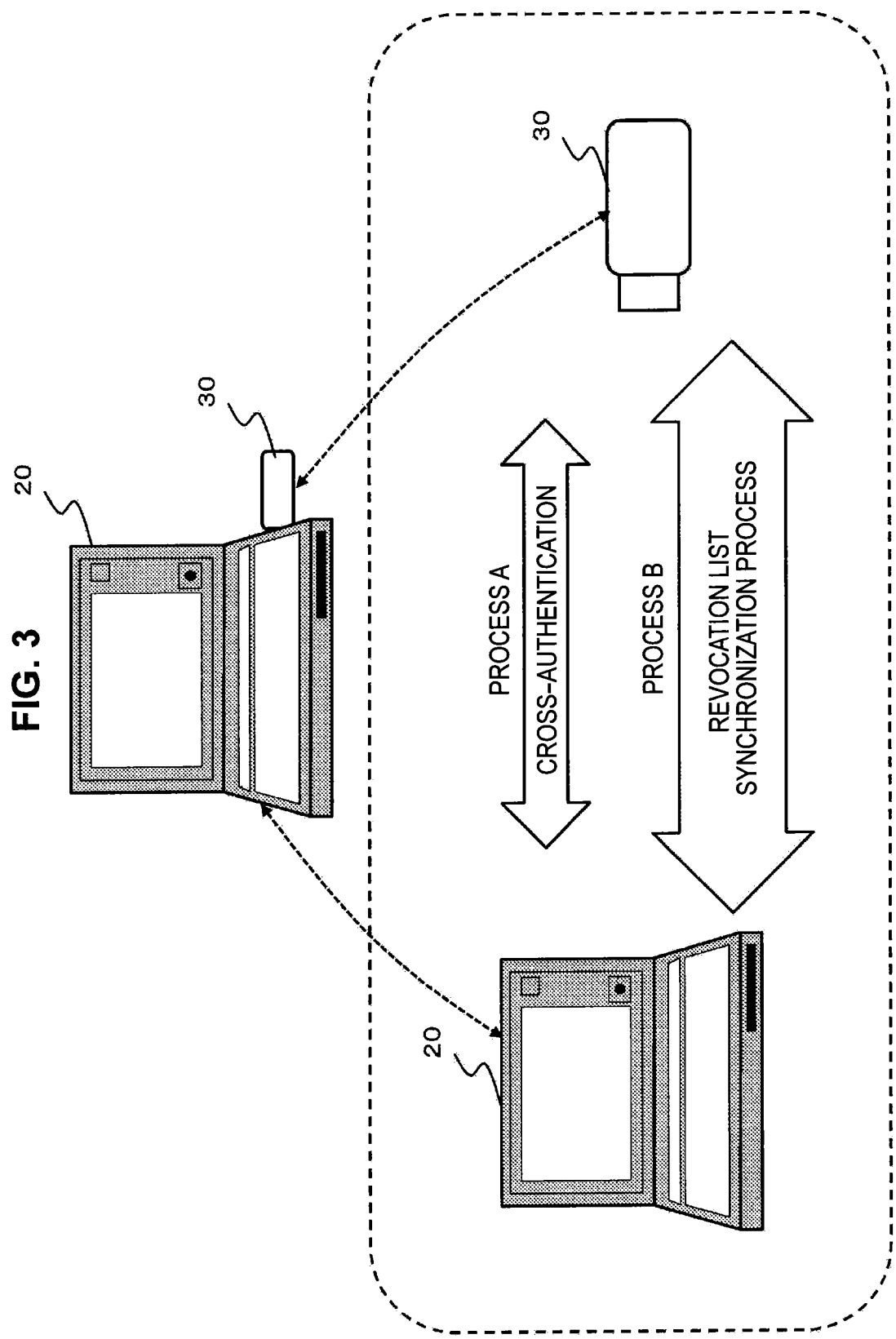
FIG. 3 is a diagram illustrating a process between an information processing device which executes content recording and reproduction and a content recording medium.

When the information processing device 20 such as the PC 22 has the information storage device 30 such as the memory card 31 mounted thereon and records the content in the information storage device 30 or when the information processing device 20 reproduces the content recorded in the information storage device 30, the information processing device 20 executes, as preprocessing, (Process A) a cross-authentication process between the information processing device 20 and the information storage device 30, and (Process B) a process of synchronizing the revocation list between the information processing device 20 and the information storage device 30, as illustrated in FIG. 3.

The cross-authentication process, for example, is executed according to an ECDH (Elliptic Curve Diffie-Hellman) encryption scheme which is a public key encryption algorithm.

Further, a process using a key set of a public key and a private key held in the information processing device 20 and the information storage device 30 is executed in this cross-authentication process.

In addition, a process of mutually providing a public key certificate between the devices is performed, and a process of verifying whether an ID of a device, a key or a public key certificate of the partner is recorded in the revocation list, which is a registration list of fraudulent devices, is performed. For example, when the ID of the partner device is recorded in the revocation list, the partner device is determined to be a fraudulent device. In this case, subsequent processes, such as a process of reproducing or recording content, may stop.

The revocation synchronization process is a process of comparing a version of the revocation list held in the information processing device 20 with a version of the revocation list held in the information storage device 30, selecting the revocation list of a newer version, and replacing an old revocation list of each device with a new one. This process is referred to as a process of synchronizing the revocation list or a process of updating the revocation list.

Further, the revocation synchronization process (updating process) is executed not only between the information storage device 30 and the information processing devices 20, but also, for example, between the information storage device 30 and the content server 12 which is a content provision source or between the information processing device 20 and the content server.

[2. Regarding an Example of a Configuration of the Information Storage Device]

Next, an example of a configuration of the information storage device such as the memory card 31 used as a content recording medium will be described.

Figure 4:
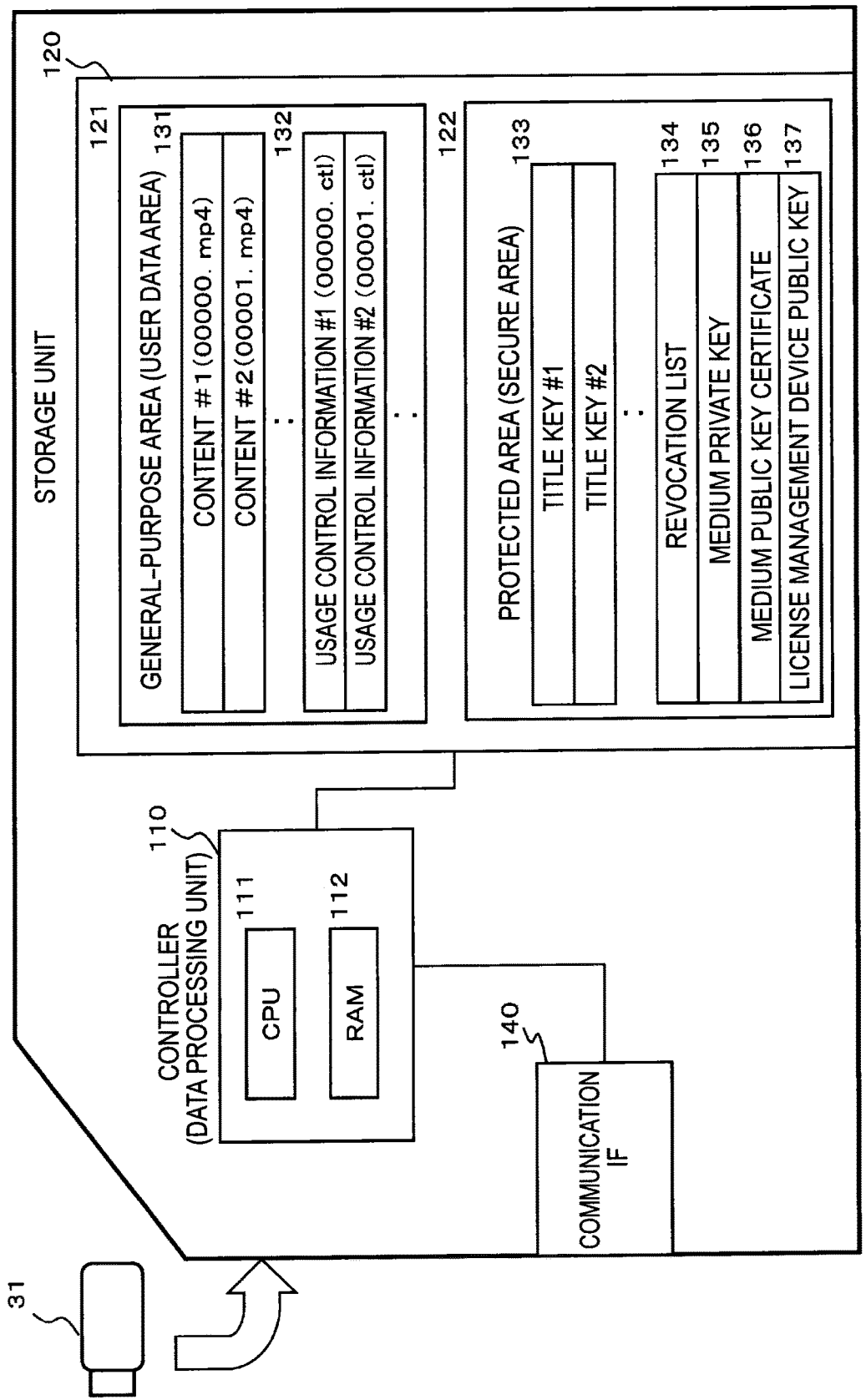
FIG. 4 is a diagram illustrating an example of a concrete configuration of a memory card.

An example of a concrete configuration of the memory card 31 is illustrated in FIG. 4.

The memory card 31 is mounted, for example, on the information processing device (host) 20 which performs content recording and reproduction. Access to the memory card 31 is performed from the information processing device 20, a server connected via the information processing device 20, or the like, and reading and writing of data is performed.

The memory card 31 includes a controller (a data processing unit) 110, a storage unit 120, and a communication IF 140, as illustrated in FIG. 4. The memory card 31, for example, performs communication with the information processing device (host) via the communication IF 140.

The controller (data processing unit) 110 includes a CPU 111 having a program execution function, a RAM 112, and the like. The RAM 112 is used as a recording area for a data processing program executed by the CPU, various parameters, ID information or key information specific to the controller, or the like.

The storage unit 120 is divided into a general-purpose area (user data area) 121 to which free access is basically permitted, and a protected area (secure area) 122 to which the free access is not permitted.

For example, content 131 provided by the content server or usage control information 132 having usage permission information such as copy control information corresponding to the content recorded therein is recorded in the general-purpose area (user data area) 121. In many cases, the content is content encrypted by a title key.

The usage control information is set in correspondence with the content, and is provided together with the content in many cases. For example, when the content is downloaded from the server and recorded, a usage control information file corresponding to the downloaded content is also downloaded and recorded together. A data structure of the usage control information file will be described below.

Various private information is recorded in the protected area (secure area) 122.

For example, the private information is an encryption key (title key) applied to decoding of the content. The example illustrated in FIG. 4 shows an example of storage of the following data:

Title key 133,
revocation list 134,
medium private key 135,
medium public key certificate 136, and
license management device public key 137.

The title key 133 is an encryption key applied to a process of encrypting or decoding the content recorded in the general-purpose area 121.

In addition, the title key stored in the protected area (secure area) 122 is stored as a converted title key obtained through predetermined data conversion. Specifically, for example, the title key is stored as data resulting from an exclusive OR operation (XOR) of a hash value of the content-corresponding usage control information or other information.

When the decoding of the content is performed, the converted title key stored in the protected area (secure area) 122 is acquired, a predetermined operation is executed to calculate the title key, and the decoding process is executed using the calculated title key.

The revocation list 134 is a list in which a device identifier (ID) of a fraudulent device, specifically, an information processing device such as a recording and reproduction device, an information storage device such as a memory card, or the like determined to be the fraudulent device, or an identifier (ID) of a reproduction program installed in the device or a public key certificate stored in the device is registered. The revocation list 134 is a list issued and sequentially updated by the license management device. A signature of the license management device is set in the revocation list 134, and the revocation list 134 has a structure in which falsification can be verified.

The medium private key 135 and the medium public key certificate 136 are a private key corresponding to the memory card 31 conforming to a public key cryptosystem and a certificate in which a public key is stored.

The license management device public key 137 is, for example, a public key of the license management device, which is an entity which issues the revocation list 134, the medium private key 135, and the medium public key certificate.

For example, the license management device public key 137 is used in the process of verifying the signature set in the revocation list 134 or the process of verifying the signature set in the public key certificate.

[3. Regarding an Example of a Data Structure of the Revocation List]

Next, an example of a data structure of the revocation list 134 will be described with reference to FIG. 5.

The revocation list 134 is a list in which the device identifier (ID) of the information processing device such as a recording and reproduction device or the information storage device such as a memory card determined to be a fraudulent device, or the identifier (ID) of the public key certificate stored in the fraudulent device is registered, as described above. The revocation list 134 is a list that the license management device issues and sequentially updates. The signature of the license management device is set in the revocation list 134, and the revocation list 134 has a structure in which falsification can be verified.

Further, an entry selectable in correspondence with individual use content is recorded in the revocation list of the present disclosure. In other words, for example, when content used in the reproduction device is identified, a specific entry of the revocation list applied to the content is determined based on recorded data of the usage control information, and only a host having a host ID recorded in the specific entry is selected as a revocation host (=prohibition host). With this configuration, the content-corresponding revocation control is realized.

The structure of the revocation list illustrated in FIG. 5 will be described.

Figure 5:
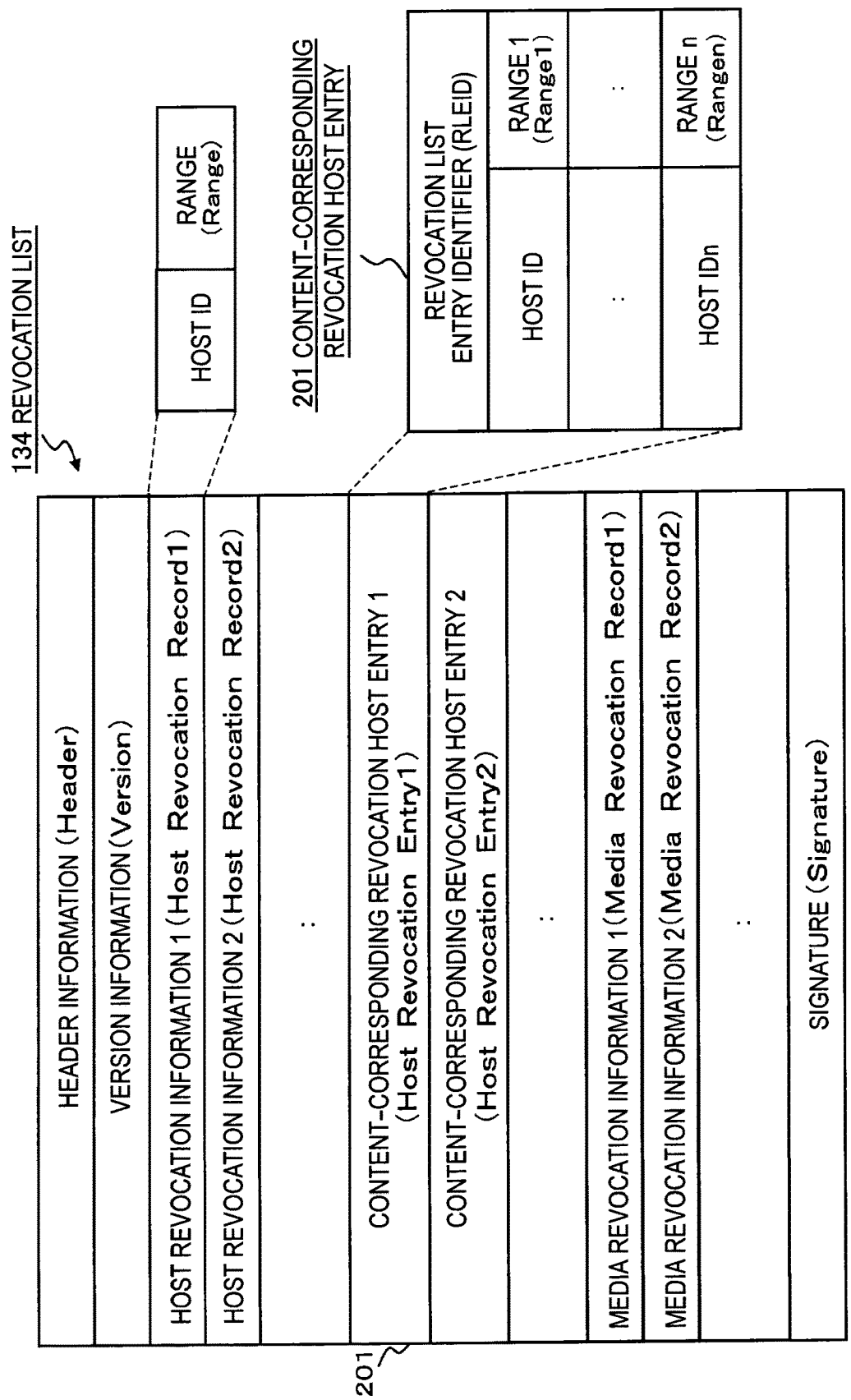
FIG. 5 is a diagram illustrating an example of a data structure of a revocation list.

Information of:
header information (Header),
version information (Version),
host revocation information (Host Revocation Record),
content-corresponding revocation host entry (Host Revocation Entry) 201,
media revocation information (Media Revocation Record), and
signature (Signature)
is recorded in the revocation list, as illustrated in FIG. 5.

Identification information indicating the revocation list, or the like, is recorded in the header information (Header).

The version information (Version) indicates a version of the revocation. For example, the version is set in such a manner that a version number increases sequentially according revocation lists of a newer version, such as Ver.001, Ver.002, Ver.003, . . . .

In the process of synchronizing the revocation list described above with reference to FIG. 3, the version of the revocation list stored in the own device is compared with a version of a revocation list input from the outside, and when the list having a newer version number set therein is input, an updating process for replacing the list of the own device with the input list is executed.

An identifier (ID) of a host determined to be a fraudulent device is recorded in the host revocation information (Host Revocation Record). Further, the host is either a device (information processing device) which performs a content reproduction process or a content recording process or recording and reproduction software (application). In addition, an identifier (ID) of the device or the application itself or an identifier (ID) of a public key certificate corresponding to the device or the application is registered.

A host ID of a host by which the use of all content is prohibited is recorded in the host revocation information (Host Revocation Record). When this host revocation information (Host Revocation Record) is referred to in the cross-authentication process, and when the host ID is recorded in the host revocation information, the authentication fails and a subsequent process, e.g., reproduction or recording of the content is not executed.

As illustrated in FIG. 5, one record (recorded data) of the host revocation information (Host Revocation Record) includes data:
(a) a host ID of a host which is a revocation target, and
(b) a range (Range).

The one record has a structure in which revocation information of a plurality of host IDs can be collected and recorded.

All hosts in the range described in the (b) range from the host ID described in (a) are shown as revocation targets.

For example,
(a) Host ID=021001
(b) Range=250
In the case of this setting, host ID=021001 to 021250.
This means that the 250 hosts are revocation devices.

The content-corresponding revocation host entry (Host Revocation Entry) is an entry in which a host ID of a revocation host applied in correspondence with specific content is recorded.

This is data for realizing the content-corresponding revocation control described above.

This entry is not referred to in the cross-authentication process. The entry is referred to in use of the content, such as reproduction of the content.

The content-corresponding revocation host entry (Host Revocation Entry) is used as an area in which a host ID of a host by which reproduction of specific content or specific content set is not permitted is recorded.

(a) A revocation list entry identifier (RLEID: Revocation List Entry ID) is recorded as entry identification information in the content-corresponding revocation host entry (Host Revocation Entry) 201, as illustrated in FIG. 5.

Further, data of each of:

(b) a host ID of a host which is a revocation target, and (c) a range (Range)

is recorded, similar to the host revocation information (Host Revocation Record) described above.

This information is data similar to the above-described host revocation information (Host Revocation Record), and is data capable of identifying a range of host identifiers which are revocation targets.

However, the host ID recorded in this content-corresponding revocation host entry (Host Revocation Entry) 201 is an ID of the host by which the use of only specific content is not permitted.

A concrete use example of the content-corresponding revocation host entry (Host Revocation Entry) 201 will be described below, but the host whose host ID is recorded in this entry is set so that reproduction of specific content or a content set such as content X is not permitted.

In addition, the entry recorded in the revocation list to be applied is determined with reference to the usage control information set in correspondence with the content.

In other words, an entry identifier (RLEID: revocation list entry identifier) for identifying the entry of the revocation list to be applied to each piece of content is recorded in the usage control information (Usage Rule) set in correspondence with the content.

With reference to the entry identifier (RLEID) of the usage control information file, the entry of the revocation list is identified according to the entry identifier (RLEID). If an ID of the content reproduction device (host) is recorded in the identified entry, the host is determined to be a host by which reproduction of the content is not permitted.

If the ID of the content reproduction device (host) is not recorded in the identified entry, the host is determined to be a host by which reproduction of the content is permitted.

A detailed sequence of this process will be described below.

Further, the entry identifier (RLEID) is used as generation information for the title key to be applied to decoding of the encrypted content.

For example, when the encrypted content is provided from the server to the information storage device (medium) and recorded in the information storage device (medium), the usage control information, in which such an entry identifier (RLEID) indicating the entry of the revocation list to be applied is recorded, is provided and recorded together. The usage control corresponding to the content is realized through this process. Details of this process will be described below.

A description of the structure of the revocation list 134 illustrated in FIG. 5 will continue.

An identifier (ID) of a medium determined to be a fraudulent device, for example, the information storage device (device) such as a memory card, or software (application) is recorded in the media revocation information (Media Revocation Record). An identifier (ID) of the device or the application itself or an identifier (ID) of a public key certificate corresponding to the device or the application is also registered.

The signature (Signature) is a digital signature using a private key of the license management device (LA), which is a revocation list issuing entity. A signature target is constituent data of the revocation list.

When the revocation list is used, a verification process for the digital signature using the public key of the license management device is performed, it is confirmed that the revocation list is not falsified, and then a process of confirming registration information of the list is performed.

Further, while only the IDs of the host and the medium are shown as the registration information of the revocation devices in the example of the revocation list illustrated in FIG. 5, for example, a server which executes content provision may also be included in the registration information so that identification information (ID) of a fraudulent server is recorded, in addition to the IDs.

[4. Regarding an Example of a Data Structure of the Usage Control Information]

Next, an example of a data structure of the usage control information 132 to be set in correspondence with each piece of content 131 illustrated in FIG. 4 will be described.

Figure 6:
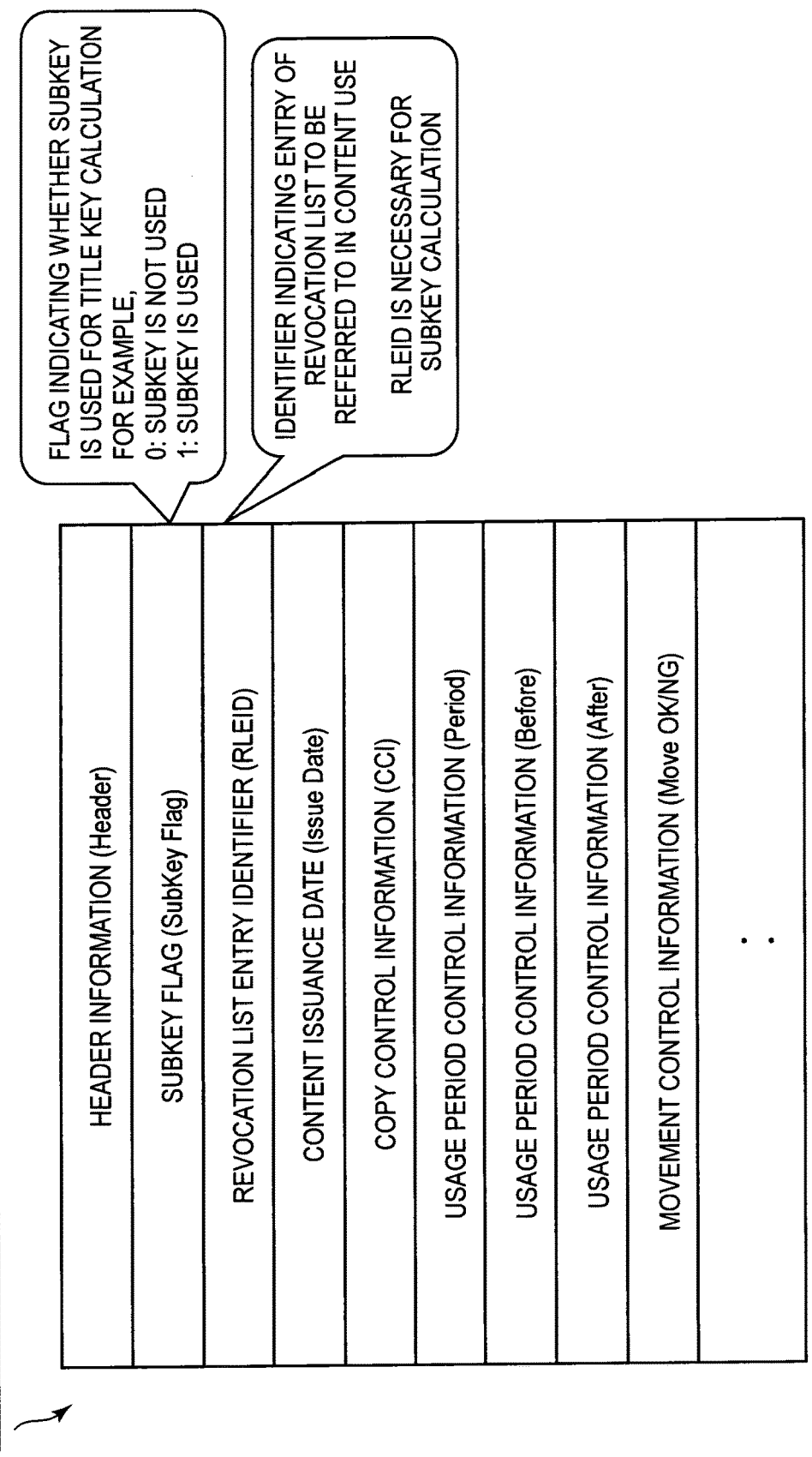
FIG. 6 is a diagram illustrating an example of a data structure of usage control information.

An example of the data structure of the usage control information 132 is illustrated in FIG. 6.

Various usage control information of the content, such as copy control information corresponding to the content, is recorded in the usage control information 132, as described above. Specifically, the usage control information 132, for example, includes the following data as illustrated in FIG. 6:

For example, information of:

header information (Header), subkey flag (SubKey Flag), revocation list entry identifier (RLEID: Revocation List Entry ID), copy control information (CCI: Copy Control Information), usage period control information (Period), usage period control information (before), usage period control information (After), and movement control information (Move OK/NG)

is recorded.

Identification information indicating the usage control information, an identifier of corresponding content, or the like is recorded in the header information (Header).

The subkey flag (SubKey Flag) is a flag indicating whether a subkey is necessary when a title key which is an encryption key applied to a content encrypting and decoding process is generated. For example, a flag set as follows is recorded.

Flag=0: The subkey is not used for generation of the title key.

Flag=1: The subkey is used for generation of the title key.

The revocation list entry identifier (RLEID: Revocation List Entry ID) is data set to realize the usage control corresponding to the content described above.

In other words, this is information for identifying an entry of the revocation list in which a host ID of a host by which the use of content corresponding to the usage control information is not permitted is recorded.

In addition, this revocation list entry identifier (RLEID) is used for generation of the subkey described above.

The content issuance date (Issue Date) is information on a date and time when content is provided to the user device. Specifically, for example, a date and time when the content server provides and records the content to and in the information storage device such as a memory card of the user is recorded.

The copy control information includes information indicating whether copying of the content is permitted, restriction information for a number of copies when the copying is permitted, or the like.

The usage period control information is information on a date and time when the use of the content is permitted. This is recorded as information, such as a period of time (Period), before a certain date and time (Before), and after a certain date and time (After).

The movement control information (Move OK/NG) is information indicating whether movement (Move) of the content to an external device is permitted.

For example, such information is recorded in a usage control information file corresponding to the content, and, for example, a process of using the content according to the control information recorded in the usage control information corresponding to the content is executed when the user device such as a reproduction device performs content use such as content reproduction.

[5. Regarding a Content Recording Process Sequence for the Information Storage Device (Media)]

Next, a content recording process sequence for the information storage device (medium) will be described.

Figure 7:
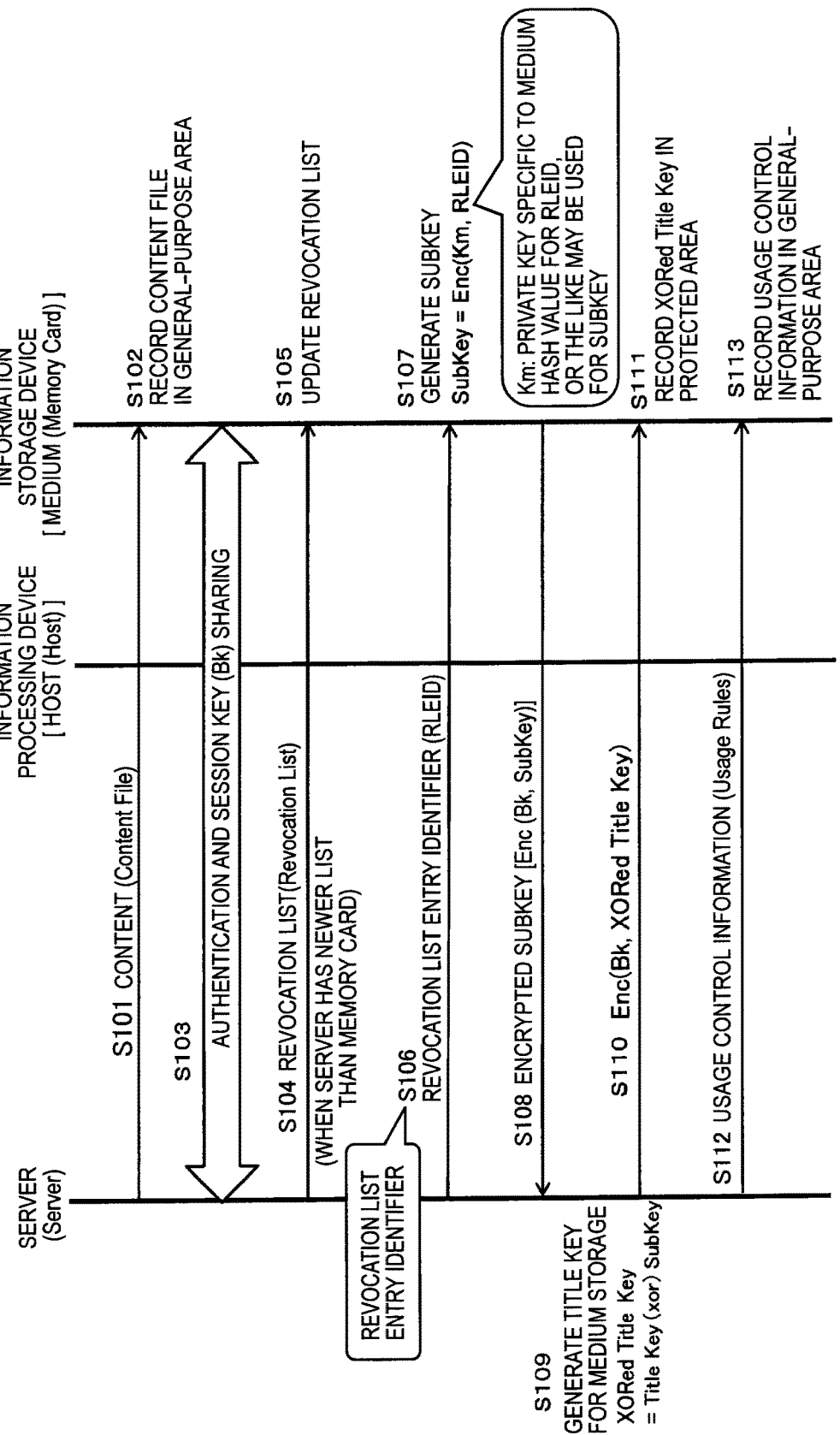
FIG. 7 is a sequence diagram illustrating a content recording process sequence for an information storage device (medium).

FIG. 7 is a diagram illustrating a process sequence when the downloaded content from the server is recorded in the information storage device, which is a medium such as a memory card.

(a) The server which executes a content provision process,
(b) the information processing device (host) on which the information storage devices (medium) such as a memory card is mounted, and
(c) the information storage device (medium) which is a content recording destination
are illustrated from the left in FIG. 7.

The information processing device (host) has the information storage devices (medium) such as a memory card mounted thereon, and the data processing unit of the information storage device (medium) executes communication with the server via the information processing device (host), and sequentially executes the processes in step S101 and subsequent steps illustrated in FIG. 7 to execute content downloading and recording processes.

In addition, the information storage device, for example, is the memory card 31 described with reference to FIG. 4, and includes the controller 110 functioning as the data processing unit which executes data processing, the storage unit 120, and the like.

Details of the processes in step S101 and subsequent steps will be described.
(Step S101)

First, the server transmits the content to the information storage device.

Further, as a premise of this process, for example, a process in which a user manipulating the information processing device accesses the server, displays a list of content provided by the server on the display of the information processing device, and selects content to be downloaded is performed.

The server transmits the content according to a designation of the user.

Further, the transmitted content is encrypted content encrypted using the title key corresponding to the content. The title key is an encryption key generated by the server as an encryption key corresponding to the content.
(Step S102)

In step S102, the encrypted content transmitted from the server is recorded in the general-purpose area (user data area) of the information storage device.

Also, only with acquisition of the encrypted content, it is difficult to perform reproduction and use of the content. It is necessary to acquire the title key which is an encryption key corresponding to this encrypted content.
(Step S103)

In step S103, the cross-authentication process and the session key (=bus key: Bk) exchange process are executed between the server and the information storage device. These processes are a cross-authentication process and a key exchange process conforming to a public key cryptosystem, and mutual reliability confirmation, and a session key (=bus key: Bk) generating and sharing process are performed.

Specifically, each device performs verification of the signature of the public key certificate of the partner and confirms that the device ID recorded in the public key certificate is not recorded in the revocation list.

In addition, the entries of the revocation list confirmed in this authentication process are host revocation information 1, 2, . . . illustrated in FIG. 5. In other words, these are not the content-corresponding revocation host entries. The host ID of the host by which the use of all content is prohibited is recorded in the host revocation information 1, 2, . . . .

When the signature verification fails or the device ID is registered in the host revocation information of the revocation list, subsequent processes are not performed. In other words, the content provision, the recording process and the like are not performed.
(Steps S104 and S105)

In steps S104 and S105, a process of synchronizing the revocation lists is executed. In other words, when a version of the revocation list stored in the information storage device is lower than a version of the revocation list held in the server, a revocation list updating process for providing the new revocation list from the server to the information storage device and replacing the old revocation list stored in the information storage device with the new revocation list is performed.

Further, this revocation list is the revocation list described above with reference to FIG. 5, and is a revocation list in which the content-corresponding revocation host entry 201 illustrated in FIG. 5 is recorded.
(Step S106)

Then, the server notifies the information storage device of the entry identifier indicating the entry of the revocation list in which the host ID of the host by which the use of the encrypted content transmitted in step S101 is not permitted is described, that is, the revocation list entry identifier (RLEID: Revocation List Entry ID) in step S106.

This entry identifier (RLEID) is an entry identifier capable of identifying the entry of the revocation list in which the host ID of the host by which the use of the content provided in step S101 is not permitted is recorded.

The server can freely set and change this entry identifier (RLEID) for each individual piece of transmission content.

(Step S107)

In step S107, the information storage device generates a subkey (Sub Key).

This subkey is generated using the revocation list entry identifier (RLEID) received from the server. For example, the encryption process using the private key (Km) of the information storage device is executed for the entry identifier (RLEID) to generate the subkey (Sub Key) according to the following equation.

Sub Key=Enc($Km$,RLEID)

In addition, Enc (a, b) indicates a process of encrypting data (b) using the key (a).

Further, the example of the process of generating the subkey described above is an example, and the subkey may be data in which the revocation list entry identifier (RLEID) and the private information of the information storage device are applied. For example, a hash value based on the revocation list entry identifier (RLEID) may be set as the subkey.

(Step S108)

The information storage device encrypts the generated subkey (Sub Key) with the session key (Bk) and transmits the resultant subkey (Sub Key) to the server in step S108. In other words, the information storage device transmits the encrypted key data:

Enk (Bk, Sub Key)

to the server.

(Step S109)

Then, the server generates a converted title key (XORed Title Key), which is conversion data of the title key stored in the information storage device (medium), using the subkey (Sub Key) in step S109.

In addition, the encrypted content output to the information storage device in step S101 is encrypted using the title key generated by the server.

The server generates the converted title key through an operation process in which the subkey is applied to the title key.

Specifically, the converted title key (XORed Title Key) is generated according to the following equation.

XORed Title Key=(Title Key)(xor)(Sub Key)

Further, (A) (xor) (B) indicates an exclusive OR (XOR) operation of A and B.

In other words, the converted title key for medium storage is generated through the XOR operation of the title key and the subkey.

In addition, for example, the hash value of the usage control information (Usage Rule) or the like may be set in the exclusive OR (XOR) operation data.

(Step S110)

Then, the server transmits the converted title key (XORed Title Key) generated in step S109 to the information storage device in step S110.

(Step S111)

Then, the information storage device records the converted title key (XORed Title Key) received from the server in the protected area (secure area) in step S111.

(Step S112)

Then, the server transmits the usage control information (Usage Rule) corresponding to the encrypted content transmitted in step S101 to the information storage device in step S112.

The usage control information (Usage Rule) is a data file having the data structure described above with reference to FIG. 6.

The revocation list entry identifier (RLEID) is recorded in this usage control information (Usage Rule) as described with reference to FIG. 6. In other words, the identifier (RLEID) indicating the entry of the revocation list in which the host ID of the host by which the use of the content is not permitted is recorded is recorded.

Further, the entry identifier (RLEID) recorded in the usage control information (Usage Rule) is the same identifier as the entry identifier (RLEID) of which the server has notified the information storage device in step S106, and is an identifier used as generation information for the subkey.

(Step S113)

Then, the information storage device records the usage control information (Usage Rule) received from the server in the general-purpose area (user data area) in step S113.

The revocation list entry identifier (RLEID) described above is recorded in the usage control information (Usage Rule).

According to the sequence illustrated in FIG. 7, the following data provided from the server is recorded in the general-purpose area of the information storage device. In other words, data of (1) the encrypted content, and
(2) the usage control information is recorded, and the following data provided from the server is recorded in the protected area of the information storage device. In other words, (3) the converted title key (XORed Title Key)

is stored.

[6. Regarding a Usage Sequence for the Content Stored in the Information Storage Device (Medium)]

Next, a process sequence when the content recorded in the information storage device (medium) is reproduced according to the sequence illustrated in FIG. 7 described above will be described with reference to FIG. 8.

Figure 8:
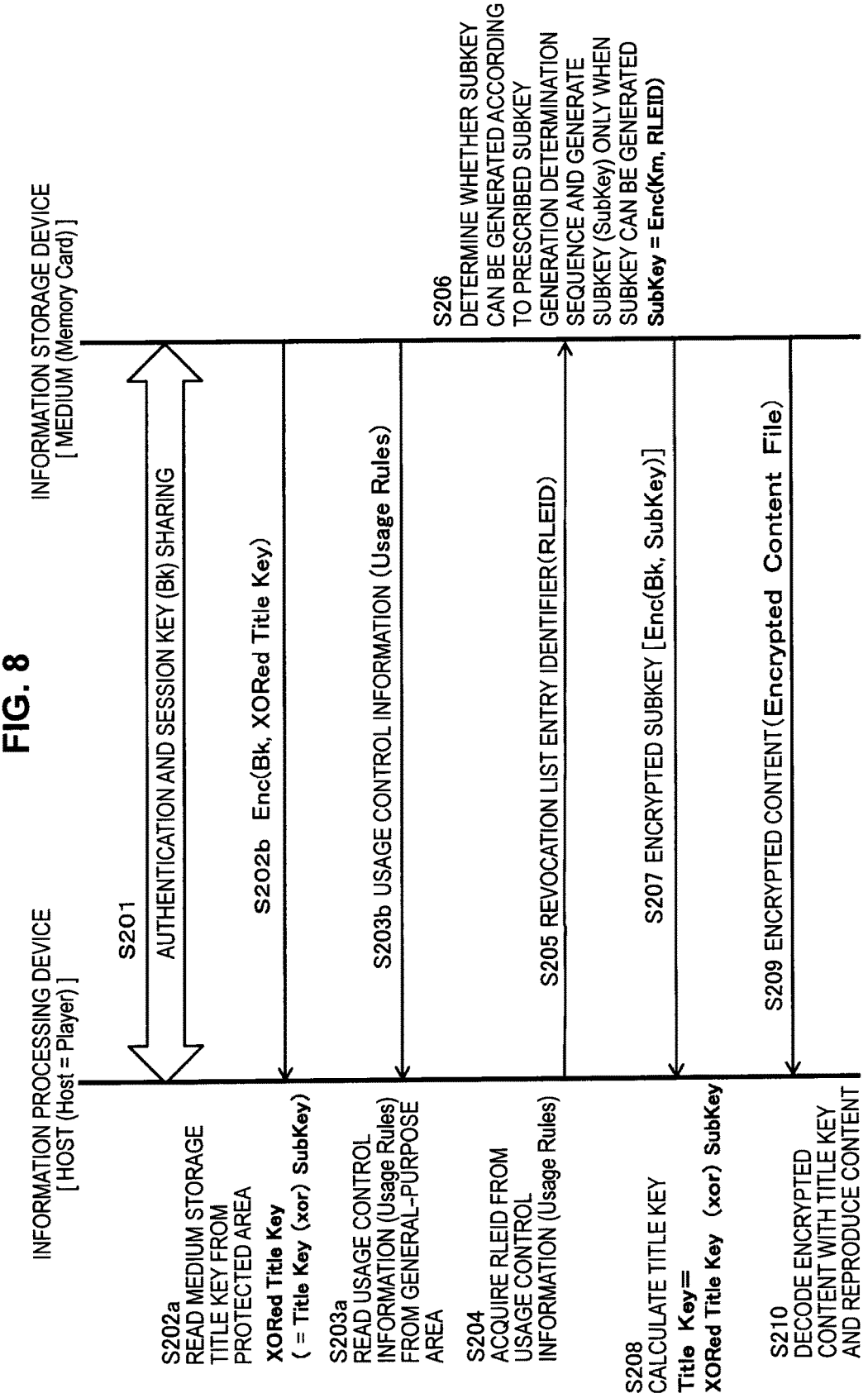
FIG. 8 is a sequence diagram illustrating a usage sequence of content stored in the information storage device (medium).

(1) The information processing device [host (Host=Player)] which executes the content reproduction process, and
(2) the information storage device [medium (Memory Card)] in which the content is stored are illustrated in FIG. 8.

The processes in step S201 and subsequent steps illustrated in FIG. 8 are sequentially executed to perform the content reproduction. Hereinafter, the process of each step will be described.

(Step S201)

First, a cross-authentication process and a session key (=bus key: Bk) exchange process are executed between the information processing device which executes the content reproduction process and the information storage device in which the content is stored. These processes are a cross-authentication process and a key exchange process conforming to a public key cryptosystem, and mutual reliability confirmation, and a session key (=bus key: Bk) generating and sharing process are performed.

Also, a confirmation as to whether the authentication partner is a fraudulent device is executed with reference to the revocation list in this authentication process, and the entries of the revocation list confirmed here are host revocation information 1, 2, . . . illustrated in FIG. 5. In other words, these are not the content-corresponding revocation host entries. The host ID of the host by which the use of all content is prohibited is recorded in the host revocation information 1, 2, . . . .

When the signature verification fails or the device ID is registered in the host revocation information of the revocation list, subsequent processes are not performed. In other words, the content reproduction process and the like are not performed.

(Steps S202a and 202b)

If the cross-authentication is successful and both of the devices are confirmed to be reliable devices, then the information processing device performs a process of reading the converted title key (XORed Title Key) stored in the protected area of the information storage device in steps S202a and 202b.

Further, when the data is read from this protected area, a determination process as to whether the information processing device has a right to access a title key storage area of the protected area is performed. This determination process is performed with reference to the recorded information of the public key certificate (Host Certificate) that the information storage device has received, for example, from the information processing device.

In this determination process, title key reading in steps S202a and 202b is executed only when it is determined that the information processing device has the right to access the title key storage area of the protected area.

When it is determined that the information processing device has no right to access the title key storage area of the protected area, the title key reading in steps S202a and S202b is not executed. In this case, the reproduction of the content is not executed.

(Steps S203a and 203b)

Then, the information processing device performs a process of reading the usage control information (Usage Rule) stored in the general-purpose area of the information storage device in steps S203a and 203b.

The usage control information (Usage Rule) is the information in which the data described above with reference to FIG. 5 is stored. In other words, the revocation list entry identifier (RLEID), which is the identifier indicating the entry of the revocation list in which the host ID of the host by which the use of the content is not permitted is recorded, is recorded.

(Step S204)

Then, the information processing device acquires the revocation list entry identifier (RLEID) from the acquired usage control information (Usage Rule) in step S204.

(Step S205)

Then, the information processing device transmits the revocation list entry identifier (RLEID) acquired from the usage control information (Usage Rule) to the information storage device in step S205.

(Step S206)

Then, the information storage device executes a subkey generation determination process according to a prescribed subkey (Sub Key) generation determination sequence, and generates the subkey when generation of the subkey is permitted in step S206.

Details of the subkey (Sub Key) generation determination sequence in step S206 will be described with reference to a flowchart illustrated in FIG. 9.

First, the data processing unit of the information storage device verifies whether an identifier (Host ID) of the host (Player) performing the reproduction process is registered as a revocation host in the entry designated by the revocation list entry identifier (RLEID) recorded in the usage control information in step S251.

When the identifier (ID) of the information processing device (host) is not registered in the entry designated by the revocation list entry identifier (RLEID) recorded in the usage control information, the determination of step S252 is Yes, and the process proceeds to step S253 to execute subkey generation.

On the other hand, when the identifier (ID) of the information processing device (host) is registered, the determination of step S252 is No and the process ends without performing the subkey generation process in step S253.

In this case, the host is a host by which the content reproduction is not permitted, and the process stops without executing the subsequent subkey generation and the content reproduction.

When it is determined in step S252 that the identifier (ID) of the information processing device (host) is not registered in the entry designated by the revocation list entry identifier (RLEID) recorded in the usage control information, the process proceeds to step S253.

In step S253, the subkey generation process is performed.

Figure 9:
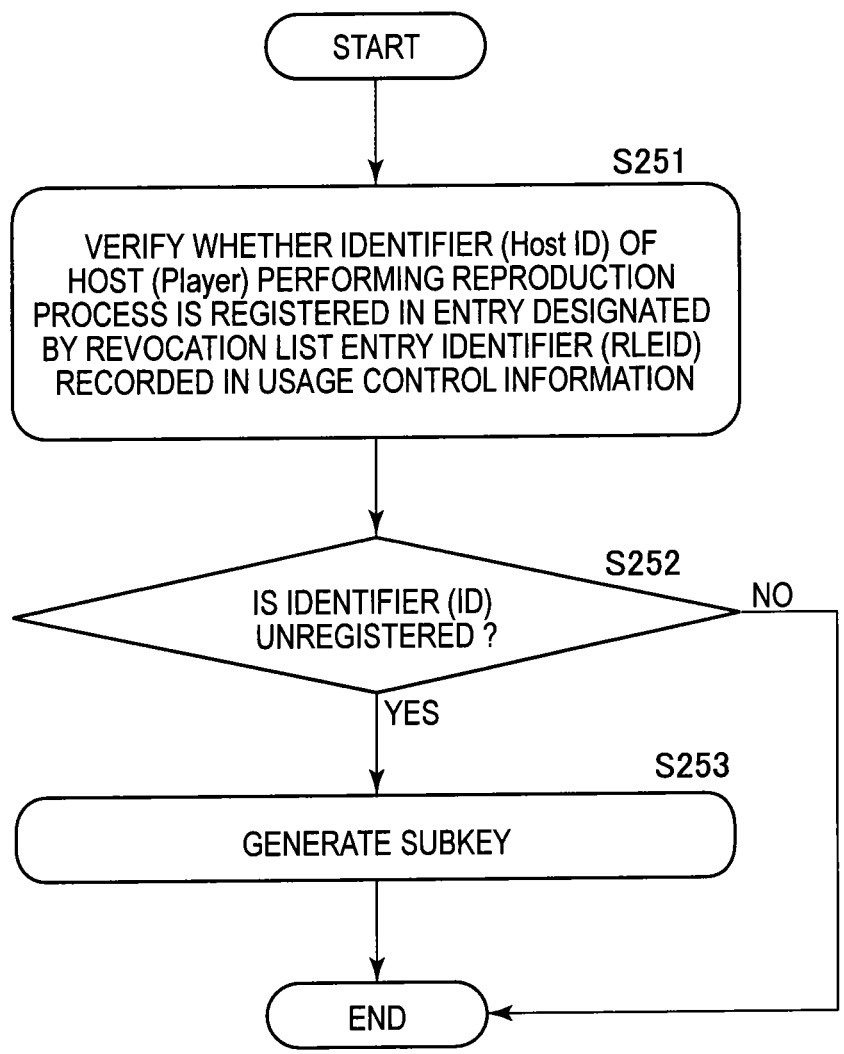
FIG. 9 is a diagram illustrating a flowchart to explain details of a subkey (Sub Key) generation determination sequence.

In step S206 illustrated in FIG. 8, the subkey generation determination is executed according to the flow illustrated in FIG. 9 to perform the subkey generation process or the generation stop determination process.

In addition, when the subkey is generated in step S206, processes in step S207 and subsequent steps illustrated in FIG. 8 are performed.

When the subkey is not generated in step S206, the processes in step S207 and subsequent steps illustrated in FIG. 8 are not performed. In this case, for example, the information storage device outputs an error message to the information processing device and ends the process. In this case, the content reproduction is not performed.

When the process proceeds to step S253 according to the flow illustrated in FIG. 9, the subkey generation process is performed. The subkey (SubKey), for example, is generated according to the following equation.

$$SubKey = Enk(Km, RLEID)$$

In other words, the subkey (SubKey) is generated through the encryption process for the revocation list entry identifier (RLEID) to which the private key (Km) of the information storage device is applied.

The revocation list entry identifier (RLEID) is an identifier which the information processing device (host) acquires from the usage control information (Usage Rule) corresponding to the content to be used and provides to the information storage device (medium) in steps S204 and S205.

In addition, this subkey generation process is executed as the same process as the subkey generation process in step S107 described above with reference to FIG. 7.

(Step S207)

If the subkey (SubKey) generation to which the revocation list entry identifier (RLEID) is applied is executed in step S206, then the information storage device encrypts the generated subkey with the session key (Bk) and transmits the resultant subkey to the information processing device (host) in step S207. In other words, the information storage device transmits the encrypted key data:

Enc (Bk, SubKey)

to the information processing device (host).

(Step S208)

Then, the information processing device (host) acquires the subkey (SubKey) through a process of decoding the encrypted key data Enc (Bk, SubKey) received from the information storage device in step S208.

Further, an operation process using the acquired subkey (SubKey) and the converted title key (XORed Title Key)

read from the information storage device in steps S202a and S202b is executed to calculate the title key (Title Key).

The process of calculating the title key (Title Key) is executed according to the following equation.

Title Key=XORed Title Key(xor)SubKey

The title key is calculated according to this equation.

Further, when the converted title key (XORed Title Key) is generated as a result of an exclusive OR of the subkey and the usage control information (Usage Rule) hash value, the exclusive OR operation of the usage control information (Usage Rule) hash value is also executed to calculate the title key.

(Step S209)

Then, the information processing device reads the encrypted content to be reproduced from the general-purpose area of the information storage device in step S209.

(Step S210)

Finally, the information processing device executes a decoding process for the encrypted content read from the information storage device in step S209 using the title key calculated in step S208, and performs the reproduction of the content as the decoding result.

Thus, when the process of reproducing the encrypted content stored in the information storage device is performed, a determination is performed as to whether generation of the subkey necessary for generation of the title key is permitted according to the determination flow illustrated in FIG. 9, the subkey is generated only when the generation of the subkey is determined to be permitted, and use of the content becomes possible.

A condition under which the content reproduction is allowed, that is, a condition under which the generation of the subkey is allowed, is that any one of the following be satisfied:

(Condition 1) Cross-authentication is successful.

Specifically, the information processing device (host) executing a content use (reproduction) process is not set as a revocation host corresponding to all content. In other words, the host ID is not recorded in the host revocation information of the revocation list.

(Condition 2) The information processing device (host) is not set as a revocation host corresponding to the content.

Specifically, the host ID is not recorded in [content-corresponding revocation host entry] of the revocation list selected by the revocation list entry identifier (RLEID) recorded in the usage control information.

If (Condition 2) and (Condition 1) are both satisfied, the subkey is generated and the use of the content becomes possible.

However, when either (Condition 1) or (Condition 2) described above is not satisfied, the generation of the subkey is not performed and the use of the content is not performed.

Through such content reproduction control, it is possible to realize the usage control in units of pieces of content as well as the usage control in units of hosts.

[7. (Embodiment 2) Regarding an Example of the Content Usage Control Using the Revocation List in which Content Usage Permission Host Information is Recorded]

The embodiment described above provides the configuration in which the host by which the use of specific content is not permitted is set by setting the content-corresponding revocation host entry in which the host ID of the host by which the use of specific content is not permitted is recorded in the revocation list, as described above with reference to FIG. 5.

Next, an example of content usage control using the revocation list in which content usage permission host information (white list) is recorded in embodiment 2 will be described.

Further, in this embodiment 2, the configuration of the information storage device (medium) in which content or the like is recorded, and recorded data example are the same as those with reference to FIG. 4.

[7-1 Regarding an Example of a Data Structure of the Revocation List in Embodiment 2]

An example of a data structure of the revocation list 134 in embodiment 2 will be described with reference to FIG. 10.

The revocation list 134 is a list in which the device identifier (ID) of the information processing device such as the recording and reproduction device or the information storage device such as a memory card determined to be a fraudulent device, or the identifier (ID) of the public key certificate stored in the fraudulent device is recorded, as described above. The revocation list 134 is a list that the license management device issues and sequentially updates. The signature of the license management device is set in the revocation list 134, and the revocation list 134 has a structure in which falsification can be verified.

Further, an entry selectable in correspondence with individual use content is recorded in the revocation list of this embodiment 2, as in the previous embodiment.

However, in the previous embodiment, the content-corresponding revocation host entry in which the host ID of the host by which the use of specific content is not permitted is recorded, whereas in the present embodiment, an entry in which content usage permission host information (white list) is recorded is set.

Further, a list including content usage prohibition host information is referred to as a blacklist (B), whereas a list including the content usage permission host information is referred to as a white list (W).

In this embodiment 2, usage control corresponding to content is realized using the revocation list in which the entry in which content usage permission host information (white list) is recorded is set, as in the previous embodiment.

A structure of the revocation list illustrated in FIG. 10 will be described.

Figure 10:
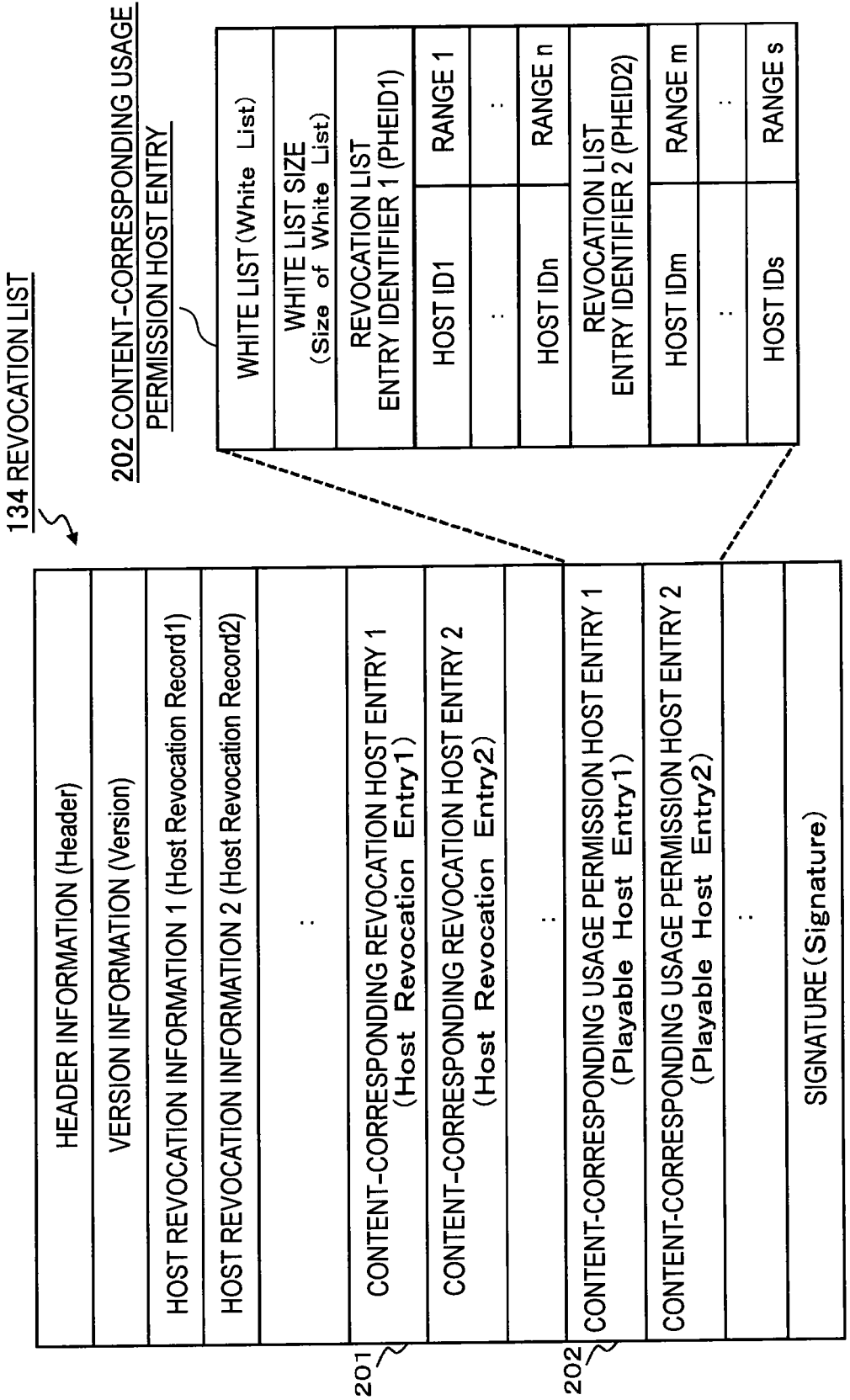
FIG. 10 is a diagram illustrating an example of a data structure of a revocation list.

Information:
header information (Header),
version information (Version),
host revocation information (Host Revocation Record),
content-corresponding revocation host entry (Host Revocation Entry) 201,
content-corresponding usage permission host entry (Playable Host Entry) 202, and
signature (Signature),
is recorded in the revocation list, as illustrated in FIG. 10.

Further, the media revocation information (Media Revocation Record) described above with reference to FIG. 5 is omitted, but a structure in which revocation information of the medium or the server is recorded may be adopted.

Since the following information:
the header information (Header),
the version information (Version),
the host revocation information (Host Revocation Record),
the content-corresponding revocation host entry (Host Revocation Entry) 201, and
the signature (Signature)
is similar to the information described above with reference to FIG. 5, a description thereof is omitted.

The content-corresponding use permission host entry (Playable Host Entry) 202 is an entry in which the host ID of the content usage permission host applied in correspondence with specific content is recorded.

This is data for realizing usage control corresponding to the content.

This entry is not referred to in a cross-authentication process. The entry is referred to at the time of content use, such as reproduction of the content.

The content-corresponding usage permission host entry (Playable Host Entry) is used, for example, as an area in which the host ID of the host by which the reproduction of specific content or a specific content set is permitted is recorded.

The content-corresponding usage permission host entry (Playable Host Entry) includes the following data as data corresponding to the entire content-corresponding usage permission host entry, as illustrated in FIG. 10.

(A1) A header indicating information of a host by which the use of the content is permitted=white list (White List).

(A2) A white list size (Size of White List) indicating a data size of the entire content-corresponding usage permission host entry (Playable Host Entry).

Further, the following data is recorded as data of each entry unit.

As identification information of this entry, data of each of:

(B1) a revocation list entry identifier (PHEID: Playable Host Entry ID), (B2) a host ID of a content usage permission target host, and (c) a range (Range).

is recorded.

This information is data similar to the above-described host revocation information (Host Revocation Record), and is data capable of identifying a range of the host identifier which is a content usage permission target.

The host ID recorded in this content-corresponding usage permission host entry (Playable Host Entry) 202 is an ID of a host by which the use of only specific content is permitted.

An example of concrete use of this content-corresponding usage permission host entry (Playable Host Entry) 202 will be described below, but the host whose host ID is recorded in this entry is set so that reproduction of specific content or a content set, such as content X, is permitted by the host.

In addition, the entry recorded in the revocation list to be applied is determined with reference to the usage control information set in correspondence with the content.

In other words, an entry identifier (PHEID: revocation list entry identifier) for identifying an entry of the revocation list to be applied to the content is recorded in the usage control information (Usage Rule) set in correspondence with each piece of content.

With reference to the entry identifier (PHEID) of the usage control information file, the entry of the revocation list is identified according to the entry identifier (PHEID). If the ID of the content reproduction device (host) is recorded in the identified entry, the host is determined to be a host by which the reproduction of the content is permitted.

If the ID of the content reproduction device (host) is not recorded in the identified entry, the host is determined to be a host by which the reproduction of the content is not permitted.

A detailed sequence of this process will be described below.

Further, the entry identifier (PHEID) is used as generation information for the title key to be applied to decoding of the encrypted content.

For example, when the encrypted content is provided from the server to the information storage device (medium) and recorded in the information storage device (medium), the usage control information in which such an entry identifier (PHEID) indicating the entry of the revocation list to be applied is recorded is provided and recorded together. Usage control corresponding to the content is realized through this process. Details of this process will be described below.

[7-2 Regarding an Example of a Data Structure of the Usage Control Information in Embodiment 2]

Next, an example of a data structure of the usage control information 132, that is, the usage control information 132 set in correspondence with each piece of content 131 illustrated in FIG. 4 in this embodiment, will be described.

An example of a data structure of the usage control information 132 is illustrated in FIG. 11.

Various usage control information for the content, such as copy control information corresponding to the content, is recorded in the usage control information 132, as described above. Specifically, the usage control information 132 includes, for example, the following data, as illustrated in FIG. 6.

For example, information of:
header information (Header),
subkey flag (SubKey Flag),
revocation/usage permission identification flag (B/W identification flag),
revocation list entry identifier (RLEID/PHEID),
copy control information (CCI: Copy Control Information),
usage period control information (Period),
usage period control information (before),
usage period control information (After), and
movement control information (Move OK/NG)
is recorded.

Since the data other than the revocation/usage permission identification flag (B/W identification flag) and the revocation list entry identifier (RLEID/PHEID) among the data is similar to the data described above with reference to FIG. 6, a description thereof is omitted.

For the revocation/usage permission identification flag (B/W identification flag), a flag for identifying whether the entry identifier recorded as [revocation list entry identifier (RLEID/PHEID)] is (1) an entry identifier corresponding to a black list designating the content-corresponding revocation host entry 201 or (2) an entry identifier corresponding to a white list designating the content-corresponding usage permission host entry 202 in the revocation list illustrated in FIG. 10 is recorded in its usage control information.

For example, a flag set as:

(1) flag=0 when the identifier is the entry identifier corresponding to the blacklist designating the content-corresponding revocation host entry 201, and (2) flag=1 when the identifier is an entry identifier corresponding to the white list designating the content-corresponding usage permission host entry 202 is recorded.

Further, the value of this flag is used for generation of the subkey.

The revocation list entry identifier (RLEID/PHEID) will be described.

In this embodiment, the revocation list entry identifier is set such that an identifier for identifying any one of the two kinds of entries of the revocation list described with reference to FIG. 10 can be recorded. In other words, an identifier for identifying any one of the two kinds of entries:

(1) the content-corresponding revocation host entry 201, and (2) the content-corresponding usage permission host entry 202 is recorded.

(1) The identifier for identifying the content-corresponding revocation host entry 201 is an RLEID (Revocation List Entry ID).

(2) The identifier for identifying the content-corresponding usage permission host entry 202 is a PHEID (Playable Host Entry ID).

Either the RLEID or the PHEID is recorded as the revocation list entry identifier.

When the RLEID is recorded, this is applied as information identifying the entry of the revocation list in which the host ID of the host by which the use of the content corresponding to the usage control information is not permitted is recorded.

When the PHEID is recorded, this is applied as information identifying the entry of the revocation list in which the host ID of the host by which the use of the content corresponding to the usage control information is permitted is recorded.

In addition, this revocation list entry identifier (RLEID/PHEID) is used for generation of the subkey described above.

[7-3 Regarding a Content Recording Process Sequence for the Information Storage Device (Medium) in Embodiment 2]

Next, a content recording process sequence for the information storage device (medium) will be described.

Figure 12:
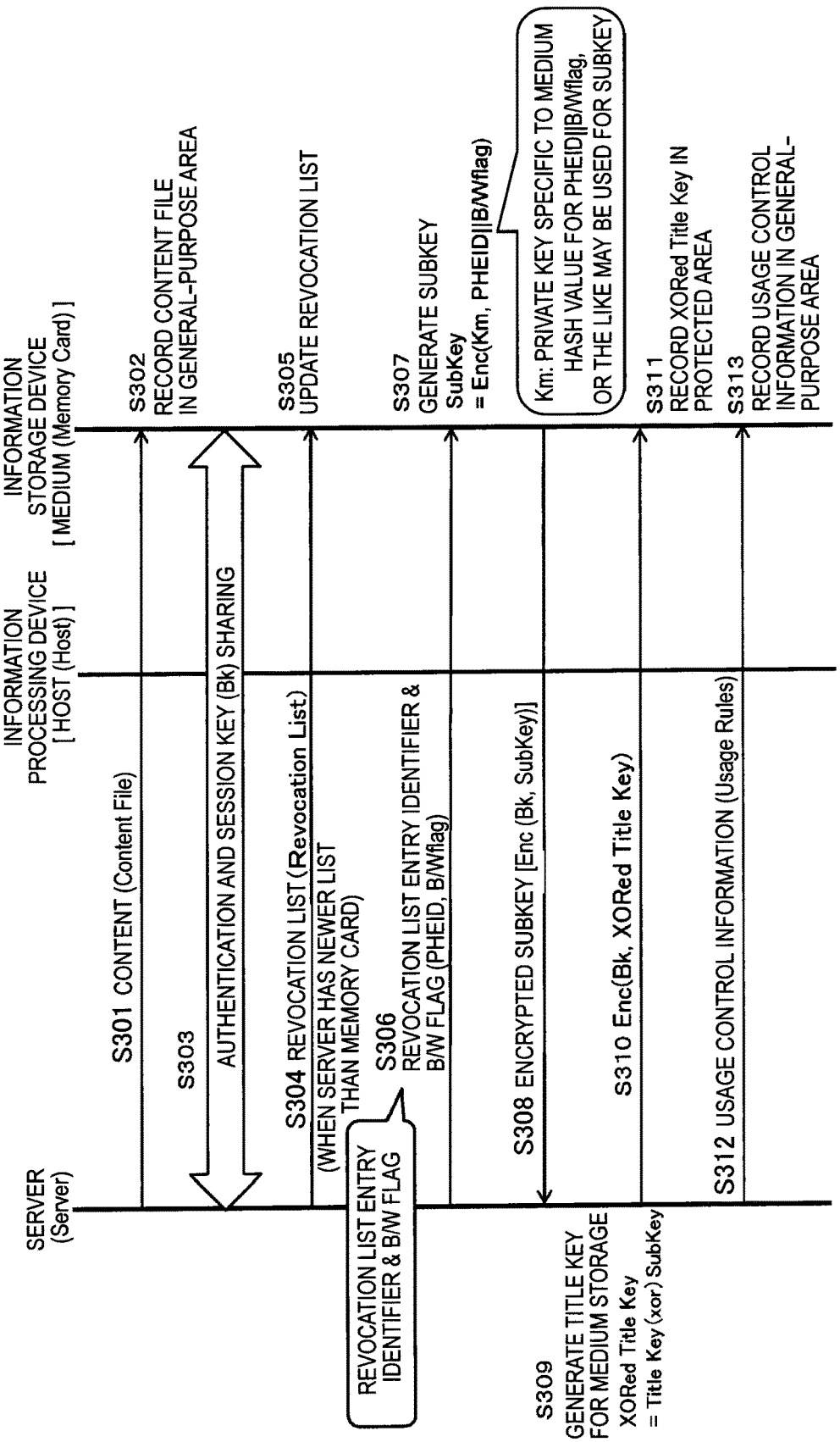
FIG. 12 is a sequence diagram illustrating a content recording process sequence for an information storage device (medium).

FIG. 12 is a diagram illustrating a process sequence when the downloaded content from the server is recorded in the information storage device which is a medium such as a memory card, as in FIG. 7 described above.

(a) The server which executes the content provision process, (b) the information processing device (host) on which the information storage device (medium) such as a memory card is mounted, and (c) the information storage device (medium) which is a content recording destination.

are illustrated from the left in FIG. 12.

The information processing device (host) has the information storage devices (medium) such as a memory card mounted thereon, and the data processing unit of the information storage device (medium) executes communication with the server through the information processing device (host), and sequentially executes processes in step S301 and subsequent steps illustrated in FIG. 12 to execute content downloading and recording processes.

In addition, the information storage device, for example, is a memory card 31 described with reference to FIG. 4, and includes the controller 110 functioning as a data processing unit which executes data processing, the storage unit 120 and the like.

Details of processes in step S301 and subsequent steps will be described.

The processes of steps S301 to S305 are the same as the processes of steps S101 to S105 described above with reference to FIG. 7.

(Step S301)

First, the server transmits content to the information storage device.

Further, as a premise of this process, for example, a process in which a user manipulating the information processing device accesses the server, displays a list of content provided by the server on a display of the information processing device, and selects content to be downloaded is performed.

The server transmits the content according to a designation of the user.

In addition, the transmitted content is encrypted content encrypted using a title key corresponding to the content. The title key is an encryption key corresponding to the content and is an encryption key generated by the server.

(Step S302)

In step S302, the encrypted content transmitted from the server is recorded in the general-purpose area (user data area) of the information storage device.

Further, only with acquisition of the encrypted content, it is difficult to perform reproduction and use of the content. It is necessary to acquire the title key which is an encryption key corresponding to this encrypted content.

(Step S303)

In step S303, a cross-authentication process and a session key (=bus key: Bk) exchange process are executed between the server and the information storage device. These processes are a cross-authentication process and a key exchange process conforming to a public key cryptosystem, and mutual reliability confirmation, and a session key (=bus key: Bk) generating and sharing process are performed.

Specifically, each device performs verification of the signature of the public key certificate of the partner, and also confirms that the device ID recorded in the public key certificate is not recorded in the revocation list.

Further, entries of the revocation list confirmed in this authentication process are host revocation information 1, 2, . . . illustrated in FIG. 10. In other words, the entries are not the content-corresponding revocation host entry and the content-corresponding usage permission host entry. A host ID of a host by which the use of all content is prohibited is recorded in the host revocation information 1, 2, . . . .

When the signature verification fails or the device ID is registered in the host revocation information of the revocation list, subsequent processes are not performed. In other words, a content providing or recording process and the like are not performed.

(Steps S304 and S305)

In steps S304 and S305, a process of synchronizing the revocation lists is executed. In other words, when a version of the revocation list stored in the information storage device is lower than a version of the revocation list held in the server, a revocation list updating process for providing a new revocation list from the server to the information storage device and replacing the old revocation list stored in the information storage device with the new revocation list is performed.

Further, this revocation list is the revocation list described above with reference to FIG. 10, and is a revocation list in which the content-corresponding revocation host entry 201 or the content-corresponding usage permission host entry 202 illustrated in FIG. 10 is recorded.

(Step S306)

Then, the server notifies the information storage device of the entry identifier (RLEID: Revocation List Entry ID) indicating the entry (content-corresponding revocation host entry) of the revocation list in which the host ID of the host by which the use of the encrypted content transmitted in step S301 is not permitted is recorded or the entry identifier (PHEID: Playable Host Entry ID) indicating the entry (content-corresponding usage permission host entry) of the revocation list in which the host ID of the host by which the use of the encrypted content transmitted in step S301 is permitted is recorded, and a flag indicating whether the notified entry identifier is the RLEID or the PHEID, that is, the revocation/usage permission identification flag (B/W identification flag) recorded in the usage control information described with reference to FIG. 11 in step S306.

Further, since the process when the RLEID is transmitted is substantially the same as the process in the case described above with reference to FIG. 7 except for whether the flag is used, an example of the process when the entry identifier (PHEID: Playable Host Entry ID) indicating the content-corresponding usage permission host entry of the revocation list is notified of will be described hereinafter.

In step S306, the entry identifier (PHEID) of which the server notifies the information storage device is an entry identifier capable of identifying the entry of the revocation list in which the host ID of the host by which the use of the content provided in step S101 is permitted is recorded.

The server can freely set and change this entry identifier (PHEID) for each individual piece of transmitted content.
(Step S307)

In step S307, the information storage device generates a subkey (Sub Key).

This subkey is generated by applying the revocation list entry identifier (PHEID) and the revocation/usage permission identification flag (B/W flag) received from the server. For example, an encryption process using a private key (Km) of the information storage device is executed for connection data of the entry identifier (PHEID) and the revocation/usage permission identification flag (B/W identification flag) to generate the subkey (Sub Key) according to the following equation.

$$\text{Sub Key} = \text{Enc}(Km, \text{PHEID} || B/W \text{ flag})$$

Further, Enc (a, b) indicates an encryption process for data (b) using a key (a).

Further, the example of the process of generating the subkey is an example, and the subkey may be data in which the revocation list entry identifier (RLEID or PHEID), the revocation/usage permission identification flag (B/W flag), and the private information of the information storage device are applied. For example, a hash value based on the revocation list entry identifier (RLEID or PHEID) and the revocation/usage permission identification flag (B/W flag) may be set as the subkey.
(Step S308)

The information storage device encrypts the generated subkey (Sub Key) with the session key (Bk) and transmits the resultant subkey to the server in step S308. In other words, encrypted key data Enk (Bk, Sub Key)

is transmitted to the server.
(Step S309)

Then, the server generates a converted title key (XORed Title Key) which is conversion data of the title key stored in the information storage device (medium), by applying the subkey (Sub Key) in step S309.

In addition, the encrypted content output to the information storage device in step S301 is encrypted using the title key generated by the server.

The server generates the converted title key through an operation process in which the subkey is applied to this title key.

Specifically, the converted title key (XORed Title Key) is generated according to the following equation.

$$\text{XORed Title Key} = (\text{Title Key})(\text{xor})(\text{Sub Key})$$

Further, (A) (xor) (B) indicates an exclusive OR (XOR) operation of A and B.

In other words, the converted title key for medium storage is generated by the XOR operation of the title key and the subkey.

In addition, for example, a hash value of the usage control information (Usage Rule), or the like may be set in exclusive OR (XOR) operation data.
(Step S310)

Then, the server transmits the converted title key (XORed Title Key) generated in step S309 to the information storage device in step S310.
(Step S311)

The information storage device then records the converted title key (XORed Title Key) received from the server in the protected area (secure area) in step S311.
(Step S312)

The server then transmits the usage control information (Usage Rule) corresponding to the encrypted content transmitted in step S301 to the information storage device in step S312.

The usage control information (Usage Rule) is a data file having the data structure described above with reference to FIG. 11.

The revocation list entry identifier (RLEID or PHEID) and the revocation/usage permission identification flag (B/W flag) are recorded in this usage control information (Usage Rule), as described with reference to FIG. 11.

Further, the revocation list entry identifier (RLEID or PHEID) and the revocation/usage permission identification flag (B/W flag) recorded in the usage control information (Usage Rule) are the same data as the revocation list entry identifier (RLEID or PHEID) and the revocation/usage permission identification flag (B/W flag) of which the server has notified the information storage device in step S306, and are data used as generation information for the subkey.
(Step S313)

The information storage device then records the usage control information (Usage Rule) received from the server in the general-purpose area (user data area) in step S313.

The revocation list entry identifier (RLEID or PHEID) and the revocation/usage permission identification flag (B/W flag) described above are recorded in this usage control information (Usage Rule).

The following data provided from the server:
(1) the encrypted content, and
(2) the usage control information is recorded in the general-purpose area of the information storage device according to the sequence illustrated in FIG. 12, and
the following data provided from the server:
(3) the converted title key (XORed Title Key)
is recorded in the protected area of the information storage device

[7-4 Regarding a Usage Sequence of the Content Stored in the Information Storage Device (Medium) in Embodiment 2]

Next, a process sequence when the content recorded in the information storage device (medium) is reproduced according to the sequence illustrated in FIG. 12 described above will be described with reference to FIG. 13.

Figure 13:
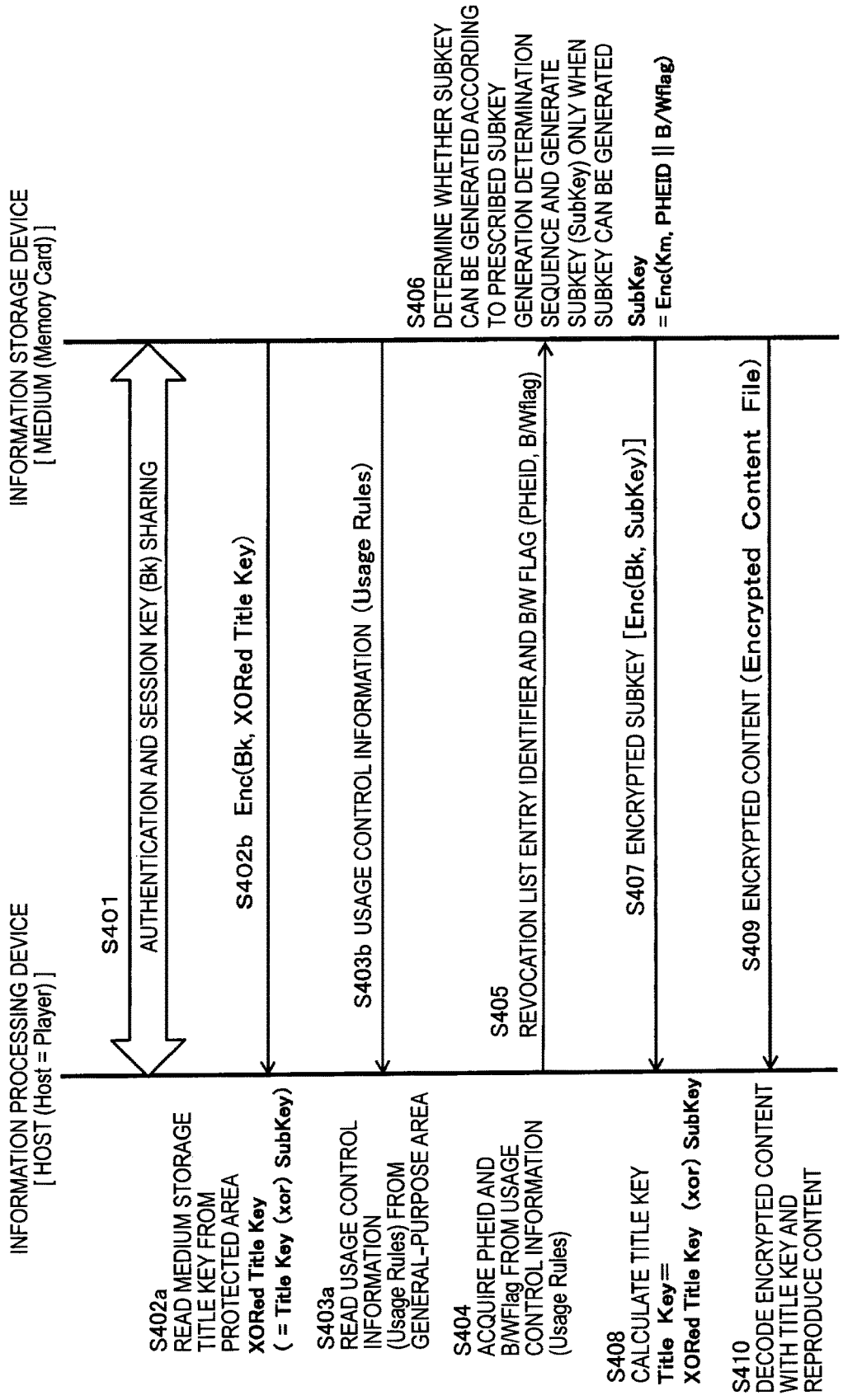
FIG. 13 is a sequence diagram illustrating a usage sequence of content stored in the information storage device (medium).

(1) The information processing device [host (Host=Player)] which executes the content reproduction process, and
(2) the information storage device [medium (Memory Card)] in which the content is stored are illustrated in FIG. 13

Processes in step S401 and subsequent steps illustrated in FIG. 13 are sequentially executed and the content reproduction is performed. Hereinafter, the process of each step will be described.

(Step S401)

First, a cross-authentication process and a session key (=bus key: Bk) exchange process are executed between the information processing device which executes the content reproduction process and the information storage device in which the content is stored. These processes are a cross-authentication process and a key exchange process conforming to a public key cryptosystem, and mutual reliability confirmation, and a session key (=bus key: Bk) generating and sharing process are performed.

In addition, a confirmation as to whether an authentication partner is a fraudulent device with reference to the revocation list is performed in this authentication process, and the entries of the revocation list confirmed here are host revocation information 1, 2, . . . illustrated in FIG. 10. In other words, these are not the content-corresponding revocation host entries. The host ID of the host by which the use of all content is prohibited is recorded in the host revocation information 1, 2, . . . .

When the signature verification fails or the device ID is registered in the host revocation information of the revocation list, subsequent processes are not performed. In other words, the content reproduction process and the like are not performed.

(Steps S402a and 402b)

If the cross-authentication is successful and both the devices are confirmed to be reliable devices, then the information processing device performs a process of reading the converted title key (XORed Title Key) stored in the protected area of the information storage device in steps S402a and 402b.

In addition, when the process of reading the data from this protected area is performed, a determination process as to whether the information processing device has a right to access a title key storage area of the protected area is performed. This determination process, for example, is performed with reference to the recorded information of the public key certificate (Host Certificate) that the information storage device has received from the information processing device.

In this determination process, title key reading in steps S402a and 402b is performed only when it is determined that the information processing device has the right to access the title key storage area of the protected area.

When it is determined that the information processing device has no right to access the title key storage area of the protected area, the title key reading in steps S402a and b is not performed. In this case, the reproduction of the content is not performed.

(Steps S403a and 403b)

The information processing device then performs a process of reading the usage control information (Usage Rule) stored in the general-purpose area of the information storage device in steps S403a and 403b.

The usage control information (Usage Rule) is information in which the data described above with reference to FIG. 10 is stored. In other words, the revocation list entry identifier (RLEID or PHEID) and the revocation/usage permission identification flag (B/W flag) are recorded.

(Step S404)

The information processing device then acquires the revocation list entry identifier (RLEID or PHEID) and the revocation/usage permission identification flag (B/W flag) from the acquired usage control information (Usage Rule) in step S404.

(Step S405)

The information processing device then transmits the revocation list entry identifier (RLEID or PHEID) and the revocation/usage permission identification flag (B/W flag) acquired from the usage control information (Usage Rule) to the information storage device in step S405.

(Step S406)

The information storage device then executes a subkey generation determination process according to a prescribed subkey (Sub Key) generation determination sequence, and generates the subkey when the subkey is determined to be able to be generated in step S406.

Details of the subkey (Sub Key) generation determination sequence in step S406 will be described with reference to a flowchart illustrated in FIG. 14.

Further, an example of a process when the content-corresponding usage permission host entry in which the content usage permission host information is recorded is used will be described herein.

First, the data processing unit of the information storage device verifies whether an identifier (Host ID) of the host (Player) performing the reproduction process is registered as a reproduction permission host in the entry designated by the revocation list entry identifier (PHEID) recorded in the usage control information in step S451.

When the identifier (ID) of the information processing device (host) is registered in the entry designated by the revocation list entry identifier (PHEID) recorded in the usage control information, a determination of step S452 is Yes and the process proceeds to step S453 to execute the subkey generation.

On the other hand, when the identifier (ID) of the information processing device (host) is not registered, the determination of step S452 is No and the process ends without performing the subkey generation process of step S453.

In this case, the host is a host by which the content reproduction is not permitted, and the process stops without executing subsequent subkey generation and content reproduction.

When it is determined in step S452 that the identifier (ID) of the information processing device (host) is registered in the entry designated by the revocation list entry identifier (PHEID) recorded in the usage control information, the process proceeds to step S453.

In step S453, the subkey generation process is performed.

Figure 14:
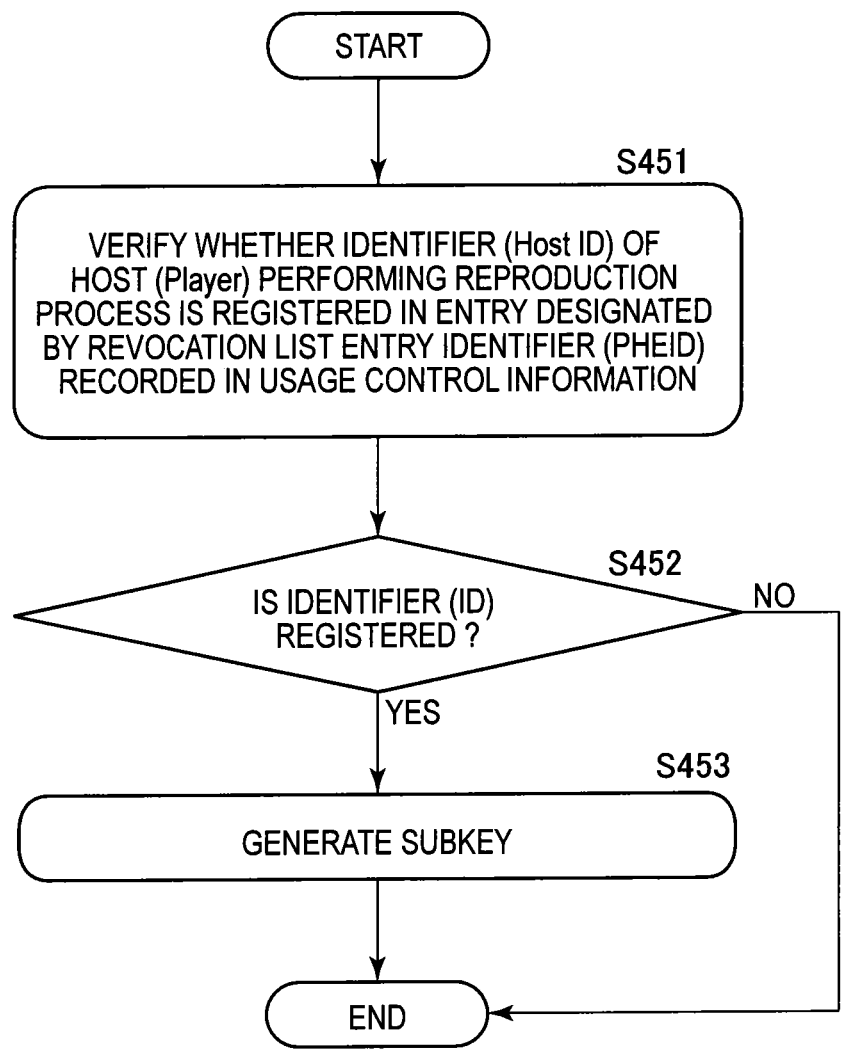
FIG. 14 is a diagram illustrating a flowchart explaining the details of a subkey (Sub Key) generation determination sequence.

In step S406 illustrated in FIG. 13, the subkey generation determination is executed to perform the subkey generation process or the generation stop determination process according to the flow illustrated in FIG. 14.

In addition, when the subkey is generated in step S406, the processes in step S407 and subsequent steps illustrated in FIG. 13 are performed.

When the subkey is not generated in step S406, the processes in step S407 and subsequent steps illustrated in FIG. 13 are not performed. In this case, for example, the information storage device outputs an error message to the information processing device and ends the process. In this case, the content reproduction is not performed.

According to the flow illustrated in FIG. 14, when the process proceeds to step S453, the subkey generation process is performed. The subkey (SubKey), for example, is generated according to the following equation.

$$SubKey=Enk(Km,PHEID\|B/W\text{ flag})$$

In other words, the subkey (SubKey) is generated through an encryption process for connection data of the revocation list entry identifier (RLEID or PHEID) and the revocation/usage permission identification flag (B/W flag) using the private key (Km) of the information storage device.

The revocation list entry identifier (RLEID or PHEID) and the revocation/usage permission identification flag (B/W flag) are data that the information processing device (host) acquires from the usage control information (Usage Rule) corresponding to the content to be used and provides to the information storage device (medium) in steps S404 and S405.

Further, this subkey generation process is performed as the same process as the subkey generation process in step S307 described above with reference to FIG. 12.

(Step S407)

If the subkey (SubKey) generation using the revocation list entry identifier (RLEID or PHEID) and the revocation/usage permission identification flag (B/W flag) is executed in step S406, then the information storage device encrypts the generated subkey with the session key (Bk) and transmits the resultant subkey to the information processing device (host) in step S407. In other words, the information storage device transmits encrypted key data:

Enc (Bk, SubKey)

to the information processing device (host).

(Step S408)

The information processing device (host) then acquires the subkey (SubKey) through a process of decoding the encrypted key data Enc (Bk, SubKey) received from the information storage device in step S408.

Further, the information processing device (host) executes an operation process using the acquired subkey (SubKey) and the converted title key (XORed Title Key) read from the information storage device in steps S402a and S402b to calculate a title key (Title Key).

The process of calculating the title key (Title Key) is executed according to the following equation.

Title Key=XORed Title Key(xor)SubKey

The title key is calculated according to this equation.

Further, when the converted title key (XORed Title Key) is generated as a result of an exclusive OR of the subkey and the usage control information (Usage Rule) hash value, the XOR operation of the usage control information (Usage Rule) hash value is also executed to calculate the title key.

(Step S409)

Then, the information processing device reads the encrypted content to be reproduced from the general-purpose area of the information storage device in step S409.

(Step S410)

Finally, the information processing device executes a decoding process using the title key calculated in step S408 for the encrypted content read from the information storage device in step S409, and performs reproduction of the content which is a decoding result.

Thus, when the process of reproducing the encrypted content stored in the information storage device is performed, a determination is made as to whether the generation of the subkey necessary for generation of the title key is allowed according to the determination flow illustrated in FIG. 14, and the subkey is generated and use of the content becomes possible only when it is determined that the generation of the subkey is permitted.

A condition under which the content reproduction is allowed, that is, a condition under which the generation of the subkey is allowed, is that any one of the following conditions be satisfied.

(Condition 1) Cross-authentication is successful.

Specifically, the information processing device (host) executing a content use (reproduction) process is not set as a revocation host corresponding to all content. In other words, the host ID is not recorded in the host revocation information of the revocation list.

(Condition 2) The information processing device (host) is set as a usage permission host corresponding to the content, Specifically, the host ID is recorded in [content-corresponding usage permission host entry] of the revocation list selected by the revocation list entry identifier (PHEID) recorded in the usage control information.

If (Condition 1) and (Condition 2) described above are both satisfied, the subkey is generated and the use of the content becomes possible.

However, when either (Condition 1) or (Condition 2) described above is not satisfied, the generation of the subkey is not executed and the use of the content is not performed.

Through such content reproduction control, it is possible to realize the usage control in units of pieces of content as well as the usage control in units of hosts.

[8. Regarding an Example of a Hardware Configuration of Each Device]

Finally, an example of a hardware configuration of each device which executes the above-described process will be described with reference to FIGS. 15 and 16.

FIG. 15 illustrates an example of a hardware configuration of an information processing device which executes content recording in a medium or content reproduction from the medium, a content provision device such as a content provision server, and an information processing device which is applicable to a license management device.

A CPU (Central Processing Unit) 701 functions as a data processing unit that executes various kinds of processes according to programs stored in a ROM (Read Only Memory) 702 or a storage unit 708. For example, the CPU executes the processes according to the sequence described above. In a RAM (Random Access Memory) 703, programs executed by the CPU 701, data, and the like are stored. The CPU 701, the ROM 702, and the RAM 703 are connected to one another via a bus 704.

The CPU 701 is connected to an input and output interface 705 via the bus 704, and an input unit 706 including various switches, a keyboard, a mouse, a microphone, and the like and an output unit 707 including a display, a speaker, and the like are connected to the input and output interface 705. The CPU 701 executes various kinds of processes in response to commands input from the input unit 706 and outputs processing results to, for example, the output unit 707.

The storage unit 708 connected to the input and output interface 705 includes, for example, a hard disk or the like, and stores programs executed by the CPU 701 and various kinds of data. A communication unit 709 communicates with external devices via a network such as the Internet or a local area network.

A drive 710 connected to the input and output interface 705 drives a removable medium 711 such as a magnetic disk, an optical disc, a magneto-optical disc, or a semiconductor memory such as a memory card, and acquires various kinds of data such as recorded content or key information. For example, content decoding and reproduction processes and the like are performed according to a reproduction program executed by the CPU using such acquired content or key data.

FIG. 16 illustrates an example of a hardware configuration of a memory card that is an information storage device.

A CPU (Central Processing Unit) 801 functions as a data processing unit that executes various kinds of processes according to programs stored in a ROM (Read Only Memory) 802 or a storage unit 807. For example, the CPU executes a communication process with the server or the host device described in each embodiment above, a process of writing or reading data to or from the storage unit 807, a process of determining whether access can be performed in units of divided areas of a protected area 811 of the storage unit 807, and the like. A RAM (Random Access Memory) 803 appropriately stores programs executed by the CPU 801, data, and the like. The CPU 801, ROM 802, and RAM 803 are connected to one another via a bus 804.

The CPU 801 is connected to an input and output interface 805 via the bus 804, and a communication unit 806 and a storage unit 807 are connected to the input and output interface 805.

The communication unit 804 connected to the input and output interface 805 executes communication with, for example, a server or a host. The storage unit 807 is a data storage area, and includes the protected area 811 to which the access is restricted and the general-purpose area 812 in and from which data can be freely recorded and read, as described above.

[9. Summary of the Configuration of the Present Disclosure]

The embodiments of the present disclosure have been described above in detail with reference to the specific embodiment. However, it is obvious that those skilled in the art can perform modifications or substitutions of the embodiments without departing from the gist of the present disclosure. In other words, the present disclosure is disclosed in the form of exemplification, and should not be restrictively construed. In order to determine the gist of the present disclosure, the claims should be considered.

Additionally, the present technology may also be configured as below.

(1)

An information storage device including:
a storage unit that stores encrypted content, usage control information of the encrypted content, and a revocation list in which revocation information of a content reproduction device is recorded; and
a data processing unit that determines whether content reproduction of an information processing device which performs decoding of the encrypted content is permitted,
wherein the data processing unit
acquires an entry identifier which is designation information for a registration entry of the revocation list recorded in the usage control information,
executes an identifier registration determination process for determining whether an identifier of the information processing device which performs decoding of the encrypted content is registered in the entry of the revocation list identified according to the acquired entry identifier, and
determines whether a subkey which is a generation key for a title key applied to the decoding of the encrypted content is to be provided to the information processing device based on a result of the identifier registration determination process.

(2)

The information storage device according to (1), wherein the data processing unit generates the subkey based on the result of the identifier registration determination process.

(3)

The information storage device according to (2), wherein the data processing unit applies the entry identifier to generate the subkey.

(4)

The information storage device according to any one of (1) to (3),
wherein the revocation list has a structure in which a content-corresponding revocation host entry in which a host ID of a usage prohibition host set in units of pieces of content is registered is recorded,
wherein the entry identifier which is designation information for a registration entry of the revocation list recorded in the usage control information is an entry identifier which identifies the content-corresponding revocation host entry, and
wherein the data processing unit
executes an identifier registration determination process for determining whether an identifier of the information processing device performing decoding of the encrypted content is registered in an entry identified according to the entry identifier which identifies the content-corresponding revocation host entry recorded in the usage control information, and
generates the subkey which is a generation key for the title key applied to decoding of the encrypted content for the information processing device only when the identifier of the information processing device is not registered in the identifier registration determination process.

(5)

The information storage device according to any one of (1) to (5),
wherein the revocation list has a structure in which a content-corresponding usage permission host entry in which a host ID of a usage permission host set in units of pieces of content is registered is recorded,
wherein the entry identifier which is designation information for a registration entry of the revocation list recorded in the usage control information is an entry identifier which identifies the content-corresponding usage permission host entry, and
wherein the data processing unit
executes an identifier registration determination process for determining whether an identifier of the information processing device performing decoding of the encrypted content is registered in an entry identified according to the entry identifier which identifies the content-corresponding usage permission host entry recorded in the usage control information, and
generates a subkey which is a generation key for the title key applied to decoding of the encrypted content for the information processing device only when the identifier of the information processing device is registered in the identifier registration determination process.

(6)

The information storage device according to any one of (1) to (5),
wherein the storage unit stores a converted title key obtained by converting the title key applied to the decoding of the encrypted content, and
wherein, when the subkey is determined to be provided to the information processing device as a result of the identifier registration determination process, the data processing unit generates the subkey applied to calculate the title key from the converted title key, and provides the subkey to the information processing device.

(7)

The information storage device according to (6), wherein the converted title key is data generated through an operation process including an exclusive OR operation of a title key and the subkey.

(8)

The information storage device according to any one of (1) to (7), wherein the data processing unit executes an encryption process or an operation process using a private key of the information storage device for constituent data of the entry identifier to generate the subkey.

(9)

An information processing device including:

a data processing unit which reads encrypted content recorded in an information storage device and executes a decoding process, wherein the data processing unit acquires a converted title key which is conversion data of a title key applied to decoding of the encrypted content, and usage control information of the encrypted content from the information storage device, acquires an entry identifier which is designation information for a registration entry of a revocation list in which revocation information of a content reproduction device is recorded from the usage control information, and outputs the entry identifier to the information storage device, inputs a subkey that the information storage device generates through an encryption process or an operation process for constituent data of the entry identifier, and calculates the title key through an operation process of the converted title key and the subkey.

(10)

An information processing device including:

a data processing unit which generates encrypted content to be recorded in an information storage device and a title key applied to decoding of the encrypted content, wherein the data processing unit outputs, to the information storage device, an entry identifier capable of identifying an entry of a revocation list in which an ID of a host by which the use of the encrypted content recorded in the information storage device is permitted or prohibited is recorded, inputs a subkey that the information storage device generates through an encryption process or an operation process for constituent data of the entry identifier, and generates a converted title key through an operation process of the title key and the subkey, and outputs the generated converted title key as recorded data for the information storage device.

(11)

An information processing system including:

a server that records encrypted content and usage control information corresponding to the encrypted content in an information storage device; and the information storage device that stores the encrypted content and the usage control information, wherein the server outputs, to the information storage device, the usage control information in which an entry identifier capable of identifying an entry of a revocation list in which an ID of a host by which the use of the encrypted content is permitted or prohibited is recorded is stored, wherein the information storage device generates a subkey through an encryption process or an operation process for constituent data of the entry identifier and outputs the subkey to the server, wherein the server generates a converted title key through an operation process of a title key which is a decoding key for the encrypted content and the subkey, and outputs the converted title key to the information storage device, and wherein the information storage device stores the converted title key in a storage unit.

(12)

An information processing system including:

an information storage device that stores encrypted content, a converted title key which is conversion data of a title key which is a decoding key for the encrypted content, and usage control information corresponding to the encrypted content; and a host device which reads and decodes the encrypted content, wherein the host device reads an entry identifier recorded in the usage control information input from the information storage device, the entry identifier being an entry identifier capable of identifying an entry of a revocation list in which an ID of a host by which the use of the encrypted content is permitted or prohibited is recorded, and outputs the entry identifier to the information storage device, wherein the information storage device generates a subkey through an encryption process or an operation process for constituent data of the entry identifier and outputs the subkey to the host device, and wherein the host device calculates the title key through an operation process of the converted title key and the subkey.

Further, a method of the process executed in the device or the system described above or a program which causes the process to be executed is included in the configuration of the present disclosure.

Furthermore, a series of processes described in the disclosure can be executed by hardware, by software and by a combined configuration of both the hardware and the software. When the process is executed by the software, it is possible to install a program in which the process sequence is recorded in a memory within a computer incorporated into dedicated hardware and to execute the program. It is also possible to install the program in a general-purpose computer capable of executing various types of processes and to execute the program. For example, the program can be recorded in a storage medium in advance. In addition to being installed in a computer from the storage medium, the program can also be received through a network, such as a local area network (LAN) or the Internet, and can be installed in a storage medium such as a hard disk built into the computer.

The various processes described in the present disclosure may not only be executed in a temporal sequence as described, but may also be executed in parallel or individually, in accordance with the processing capacity of the device executing the process or as necessary. Furthermore, the system in the present disclosure has a configuration in which a plurality of devices are logically incorporated, and the respective devices may not be included within the same housing.

INDUSTRIAL APPLICABILITY

As described above, according to the configuration of one embodiment of the present disclosure, the usage control in units of pieces of content is realized in the content usage control using the revocation list.

Specifically, the encrypted content, the usage control information, and the revocation list in which the revocation information of the content reproduction device is recorded is stored in the information storage device such as a memory card, and the data processing unit determines whether the host is permitted to reproduce the content. The data processing unit acquires the entry identifier identifying the registration entry of the revocation list from the usage control information, determines whether the host ID is registered in the entry designated by the entry identifier, and determines whether the content reproduction by the host is permitted based on a determination result. The subkey which is a generation key for a title key used to decode the encrypted content is generated and provided only when the reproduction permission is determined.

With this configuration, the usage control in units of pieces of content is realized.

REFERENCE SIGNS LIST 11 broadcasting station
12 content server
20 information processing device
21 recording and reproduction dedicated device
22 PC
23 mobile terminal
30 information storage device
31 memory card
110 controller (data processing unit)
111 CPU
112 RAM
120 storage unit
121 general-purpose area (user data area)
122 protected area (secure area)
131 content
132 usage control information
133 title key
134 revocation list
135 medium private key
136 medium public key certificate
137 license management device public key
140 communication IF
701 CPU
702 ROM
703 RAM
704 bus
705 input and output interface
706 input unit
707 output unit
708 storage unit
709 communication unit
710 drive
711 removable medium
801 CPU
802 ROM
803 RAM
804 bus
805 input and output interface
806 communication unit
807 storage unit
811 protected area
812 general-purpose area

The invention claimed is:

1. An information storage device, comprising:
a central processing unit (CPU) configured to:
store a plurality of encrypted content items, usage control information of the plurality of encrypted content items, and a first revocation list,
wherein the first revocation list includes revocation information of a plurality of information processing devices;
determine a permission associated with content reproduction by at least one information processing device of the plurality of information processing devices,
wherein the at least one information processing device decodes the plurality of encrypted content items;
acquire an entry identifier that indicates a registration entry of the first revocation list, wherein
the entry identifier is associated with at least one of the plurality of encrypted content items or the usage control information of the plurality of encrypted content items, and
the entry identifier changes for each of the plurality of encrypted content items;
determine presence of a first host identifier of a plurality of host identifiers in the registration entry of the first revocation list,
wherein each of the plurality of host identifiers corresponds to a corresponding information processing device of the plurality of information processing devices;
generate a subkey based on absence of the first host identifier in the registration entry of the first revocation list; and
acquire a converted title key from a server, wherein
the server generates the converted title key based on a XOR operation of a title key and the generated subkey,
the server transmits the generated subkey and the converted title key to the at least one information processing device based on registration of the first host identifier, and
the stored plurality of encrypted content items is decoded based on the converted title key.

2. The information storage device according to claim 1, wherein
the first revocation list further includes a plurality of content-corresponding revocation host entries,
each content-corresponding revocation host entry of the plurality of content-corresponding revocation host entries registers a correspondence between each of the plurality of host identifiers and each of the plurality of encrypted content items,
the entry identifier identifies the plurality of content-corresponding revocation host entries, and
the CPU is further configured to:
determine presence of at least one host identifier of the plurality of host identifiers in the registration entry based on the entry identifier,
wherein the identified plurality of content-corresponding revocation host entries corresponds to the usage control information of the plurality of encrypted content items; and
generate the subkey for the title key,
wherein at least one of the stored plurality of encrypted content items is decoded based on the title key.

3. The information storage device according to claim 1, wherein
the first revocation list further includes a plurality of content-corresponding revocation host entries, each content-corresponding revocation host entry of the plurality of content-corresponding revocation host entries registers a correspondence between each of the plurality of host identifiers and each of the plurality of encrypted content items, the entry identifier identifies the plurality of content-corresponding revocation host entries, and the CPU is further configured to:
  determine presence of at least one host identifier of the plurality of host identifiers in the registration entry based on the entry identifier,
    wherein the identified plurality of content-corresponding revocation host entries corresponds to the usage control information of the plurality of encrypted content items; and
  generate the subkey for the title key based on absence of the at least one host identifier in the registration entry of the first revocation list,
    wherein at least one of the stored plurality of encrypted content items is decoded based on the title key.

4. The information storage device according to claim 1, wherein
the server stores the converted title key, and
the CPU is further configured to calculate the title key from the converted title key.

5. The information storage device according to claim 1, wherein the CPU is further configured to generate the subkey based on a private key of the information storage device for constituent data of the entry identifier.

6. The information storage device according to claim 1, wherein the CPU is further configured to:
  acquire permission ID information of the at least one information processing device of the plurality of information processing devices; and
  generate the subkey based on the acquired permission ID information of the at least one information processing device.

7. An information processing device, comprising:
a central processing unit (CPU) configured to:
  read a plurality of encrypted content items from an information storage device;
  decode the plurality of encrypted content items based on a title key;
  acquire a converted title key from a server, wherein
    the server generates the converted title key based on a XOR operation of the title key and a subkey, and
    the information storage device generates the subkey;
  acquire usage control information of the plurality of encrypted content items from the information storage device,
    wherein the usage control information includes a first revocation list;
  acquire an entry identifier that indicates a registration entry of the first revocation list, wherein
    the first revocation list includes revocation information of the information processing device,
    the entry identifier is associated with at least one of the plurality of encrypted content items or the usage control information of the plurality of encrypted content items, and
    the entry identifier changes for each of the plurality of encrypted content items;
  output the entry identifier to the information storage device;
  receive the generated subkey from the information storage device,
    wherein the information storage device generates the subkey based on the entry identifier; and
  calculate the title key based on the converted title key and the generated subkey.

8. An information processing device, comprising:
a central processing unit (CPU) configured to:
  generate a plurality of encrypted content items;
  generate a title key to decode each of the plurality of encrypted content items;
  output, to an information storage device, an entry identifier that identifies an entry of a first revocation list, wherein
    the entry identifier is associated with the plurality of encrypted content items,
    the entry identifier changes for each of the plurality of encrypted content items,
    the information storage device stores the plurality of encrypted content items,
    the first revocation list records identification information of a host device, and
    one of a permission or a prohibition is associated with a use of each of the plurality of encrypted content items stored in the information storage device;
  receive a subkey from the information storage device,
    wherein the information storage device generates the subkey based on the entry identifier;
  generate a converted title key based on a XOR operation of the title key and the generated subkey; and
  output the generated converted title key to the information storage device.

9. An information processing system, comprising:
an information storage device configured to store a plurality of encrypted content items and usage control information corresponding to the plurality of encrypted content items; and
a server configured to:
  record the plurality of encrypted content items and the usage control information corresponding to the plurality of encrypted content items;
  output, to the information storage device, the usage control information, wherein
    the usage control information includes an entry identifier that identifies an entry of a first revocation list;
    the entry identifier is associated with at least one of the plurality of encrypted content items or the usage control information of the plurality of encrypted content items,
    the entry identifier changes for each of the plurality of encrypted content items,
    the first revocation list records identification information of a host device, and
    one of a permission or a prohibition is associated with a use of each of the plurality of encrypted content items based on the identification information of the host device;
  receive a subkey from the information storage device,
    wherein the information storage device generates the subkey based on the entry identifier;
  generate a converted title key based on a XOR operation of a title key and the generated subkey; and
  output the converted title key to the information storage device,
    wherein the information storage device is further configured to store the converted title key in a storage unit.

10. An information processing system, comprising:
an information storage device configured to:
   store a plurality of encrypted content items and usage control information corresponding to the plurality of encrypted content items; and
   store a converted title key and a subkey generated by the information storage device for the plurality of encrypted content items, wherein the converted title key is based on a XOR operation of a title key; and
a host device configured to:
   read and decode the plurality of encrypted content items;
   generate a title key, wherein the title key is associated with the decode of the plurality of encrypted content items;
   read an entry identifier from the stored usage control information, wherein
      the entry identifier identifies an entry of a first revocation list,
      the entry identifier is associated with at least one of the plurality of encrypted content items or the usage control information of the plurality of encrypted content items,
      the entry identifier changes for each of the plurality of encrypted content items,
      the first revocation list records identification information of the host device, and
      one of a permission or a prohibition is associated with a use of the plurality of encrypted content items based on the identification information of the host device; and
   output the entry identifier to the information storage device.

11. An information processing method, comprising:
storing a plurality of encrypted content items, usage control information of the plurality of encrypted content items, and a first revocation list,
   wherein the first revocation list includes revocation information of a plurality of information processing devices; and
determining a permission associated with content reproduction by at least one information processing device of the plurality of information processing devices, wherein
   the at least one information processing device decodes the plurality of encrypted content items, and
   the determination of the permission associated with the content reproduction includes:
      acquiring an entry identifier that indicates a registration entry of the first revocation list, wherein
         the entry identifier is associated with at least one of the plurality of encrypted content items or the usage control information of the plurality of encrypted content items, and
         the entry identifier changes for each of the plurality of encrypted content items;
      determining presence of a host identifier of the at least one information processing device in the registration entry of the first revocation list;
      generating a subkey based on absence of the host identifier in the registration entry of the first revocation list; and
      acquiring a converted title key from a server, wherein
         the server generates the converted title key based on a XOR operation of a title key and the generated subkey,
         the server transmits the generated subkey and the converted title key to the at least one information processing device based on registration of the host identifier, and
         the plurality of encrypted content items is decoded based on the converted title key.

12. An information processing method, comprising:
in an information processing device including a central processing unit:
   reading a plurality of encrypted content items from an information storage device;
   decoding the plurality of encrypted content items based on a title key;
   acquiring a converted title key from a server, wherein
      the server generates the converted title key based on a XOR operation of the title key and a subkey, and
      the information storage device generates the subkey;
   acquiring usage control information of the plurality of encrypted content items from the information storage device,
      the usage control information includes a first revocation list;
   acquiring an entry identifier that indicates a registration entry of the first revocation list, wherein
      the first revocation list includes revocation information of the information processing device,
      the entry identifier is associated with at least one of the plurality of encrypted content items or the usage control information of the plurality of encrypted content items, and
      the entry identifier changes for each of the plurality of encrypted content items;
   outputting the entry identifier to the information storage device;
   receiving the generated subkey from the information storage device,
      wherein the information storage device generates the subkey based on the entry identifier; and
   calculating the title key based on the converted title key and the generated subkey.

13. An information processing method, comprising:
in a server that includes a central processing unit:
   generating a plurality of encrypted content items;
   generating a title key for decoding each of the plurality of encrypted content items;
   outputting, to an information storage device, an entry identifier that identifies an entry of a first revocation list, wherein
      the entry identifier is associated with the plurality of encrypted content items,
      the entry identifier changes for each of the plurality of encrypted content items,
      the information storage device stores the plurality of encrypted content items,
      the first revocation list records identification information of a host device, and
      one of a permission or a prohibition is associated with a use of each of the plurality of encrypted content items based on the identification information of the host device;
   receiving a subkey from the information storage device,
      wherein the information storage device generates the subkey based on the entry identifier;
   generating a converted title key based on a XOR operation of the title key and the generated subkey; and outputting the generated converted title key to the information storage device.

14. A non-transitory computer-readable medium having stored thereon computer-executable instructions that, when executed by a processor, cause the processor to execute operations, the operations comprising:
storing a plurality of encrypted content items, usage control information of the plurality of encrypted content items, and a first revocation list,
wherein the first revocation list includes revocation information of a plurality of information processing devices; and
determining a permission that is associated with content reproduction by at least one information processing device of the plurality of information processing devices, wherein
the at least one information processing device decodes the plurality of encrypted content items, and
the determination of the permission associated with the content reproduction includes:
acquiring an entry identifier that indicates a registration entry of the first revocation list, wherein
the entry identifier is associated with at least one of the plurality of encrypted content items or the usage control information of the plurality of encrypted content items, and
the entry identifier changes for each of the plurality of encrypted content items;
determining presence of a host identifier of the at least one information processing device in the registration entry of the first revocation list;
generating a subkey based on absence of the host identifier in the registration entry of the first revocation list; and
acquiring a converted title key from a server, wherein
the server generates the converted title key based on a XOR operation of a title key and the generated subkey,
the server transmits the generated subkey and the converted title key to the at least one information processing device based on registration of the host identifier, and
the plurality of encrypted content items is decoded based on the converted title key.

15. A non-transitory computer-readable medium having stored thereon computer-executable instructions that, when executed by a processor, cause the processor to execute operations, the operations comprising:
reading a plurality of encrypted content items from an information storage device,
decoding the plurality of encrypted content items based on a title key;
acquiring a converted title key from a server, wherein
the server generates the converted title key based on a XOR operation of the title key and a subkey, and
the information storage device generates the subkey;
acquiring usage control information of the plurality of encrypted content items from the information storage device, wherein the usage control information includes a first revocation list;
acquiring an entry identifier that indicates a registration entry of the first revocation list, wherein
the first revocation list includes revocation information of information processing device,
the entry identifier is associated with at least one of the plurality of encrypted content items or the usage control information of the plurality of encrypted content items, and
the entry identifier changes for each of the plurality of encrypted content items;
outputting the entry identifier to the information storage device;
receiving the generated subkey from the information storage device,
wherein the information storage device generates the subkey based on the entry identifier; and
calculating the title key based on the converted title key and the generated subkey.

16. A non-transitory computer-readable medium having stored thereon computer-executable instructions that, when executed by a processor, cause the processor to execute operations, the operations comprising:
generating a plurality of encrypted content items;
generating a title key for decoding each of the plurality of encrypted content items;
outputting, to an information storage device, an entry identifier that identifies an entry of a first revocation list, wherein
the entry identifier is associated with the plurality of encrypted content items,
the entry identifier changes for each of the plurality of encrypted content items,
the information storage device stores the plurality of encrypted content items,
the first revocation list records identification information of a host device, and
one of a permission or a prohibition is associated with a use of each of the plurality of encrypted content items stored in the information storage device;
receiving a subkey from the information storage device, wherein the information storage device generates the subkey based on the entry identifier;
generating a converted title key based on a XOR operation of the title key and the generated subkey; and
outputting the generated converted title key to the information storage device.

* * * * *